(12) United States Patent
Matsushita

(10) Patent No.: US 9,152,848 B2
(45) Date of Patent: Oct. 6, 2015

(54) INFORMATION PROCESSING APPARATUS INCLUDING A FACE DICTIONARY, CONTROL METHOD THEREFOR, AND STORAGE MEDIUM

(71) Applicant: CANON KABUSHIKI KAISHA, Tokyo (JP)

(72) Inventor: Takahiro Matsushita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/718,365

(22) Filed: Dec. 18, 2012

(65) Prior Publication Data
US 2013/0163830 A1 Jun. 27, 2013

(30) Foreign Application Priority Data

Dec. 22, 2011 (JP) .................................. 2011-282265
Dec. 3, 2012 (JP) .................................. 2012-264744

(51) Int. Cl.
G06K 9/62 (2006.01)
G06K 9/00 (2006.01)

(52) U.S. Cl.
CPC ........ *G06K 9/00288* (2013.01); *G06K 9/00221* (2013.01); *G06K 9/00926* (2013.01)

(58) Field of Classification Search
None
See application file for complete search history.

(56) References Cited

U.S. PATENT DOCUMENTS

| 7,916,903 B2 * | 3/2011 | Eura et al. ..................... 382/118 |
| 2003/0039380 A1 * | 2/2003 | Sukegawa et al. ............ 382/118 |
| 2007/0150747 A1 * | 6/2007 | Mani et al. ..................... 713/186 |
| 2007/0237368 A1 * | 10/2007 | Bjorn et al. ................... 382/124 |
| 2010/0182123 A1 * | 7/2010 | Press ............................ 340/5.28 |
| 2012/0294496 A1 * | 11/2012 | Nakamoto ................... 382/118 |
| 2013/0050461 A1 * | 2/2013 | Wada et al. ..................... 348/77 |

FOREIGN PATENT DOCUMENTS

JP 2008-278350 11/2008

\* cited by examiner

*Primary Examiner* — Brian P Werner
(74) *Attorney, Agent, or Firm* — Cowan, Liebowitz & Latman, P.C.

(57) ABSTRACT

An information processing apparatus generates, for each person, a first face dictionary storing face data concerning a face of the person included in an image. The apparatus receives, from an imaging apparatus, a second face dictionary which is stored face data of a person corresponding to the first face dictionary and which may be updated the face data using images obtained on the imaging apparatus, and stores. The information processing apparatus transmits the first face dictionary to the imaging apparatus when an update date and time of the second face dictionary is older than a date and time of the first face dictionary. The information processing apparatus does not transmit the first face dictionary to the imaging apparatus when the first face dictionary includes face data of the person included in an image captured outside of a predetermined period.

30 Claims, 17 Drawing Sheets

F I G. 3B (FACE DICTIONARY MANAGEMENT FILE)

| | |
|---|---|
| 311 | FACE DICTIONARY (1) |
| 312 | FACE DICTIONARY FILE NAME (1)(yamada.kao) |
| 313 | UPDATE DATE AND TIME (1)(2011/05/23 16:33:00) |
| 314 | DETAILED FACE IMAGE INFORMATION (1-1) |
| 315 | FACE IMAGE FILE NAME (1-1)(face001.jpg) |
| 316 | IMAGING DATE AND TIME (1-1)(2011/05/23 15:00:02) |
| 317 | CAMERA GENERATION FLAG (1-1)(true) |
| 318 | REPRESENTATIVE IMAGE FLAG (1-1)(true) |
| 320 | DETAILED FACE IMAGE INFORMATION (1-2) |
| | DETAILED FACE IMAGE INFORMATION (1-N) |
| 330 | FACE DICTIONARY (2) |

F I G. 3A (FACE DICTIONARY)

| | |
|---|---|
| 301 | PERSON NAME |
| 302 | FACE IMAGE INFORMATION (1) |
| 303 | FEATURE AMOUNT DATA |
| 304 | CAMERA GENERATION FLAG |
| | FACE IMAGE INFORMATION (2) |
| | FACE IMAGE INFORMATION (N) |

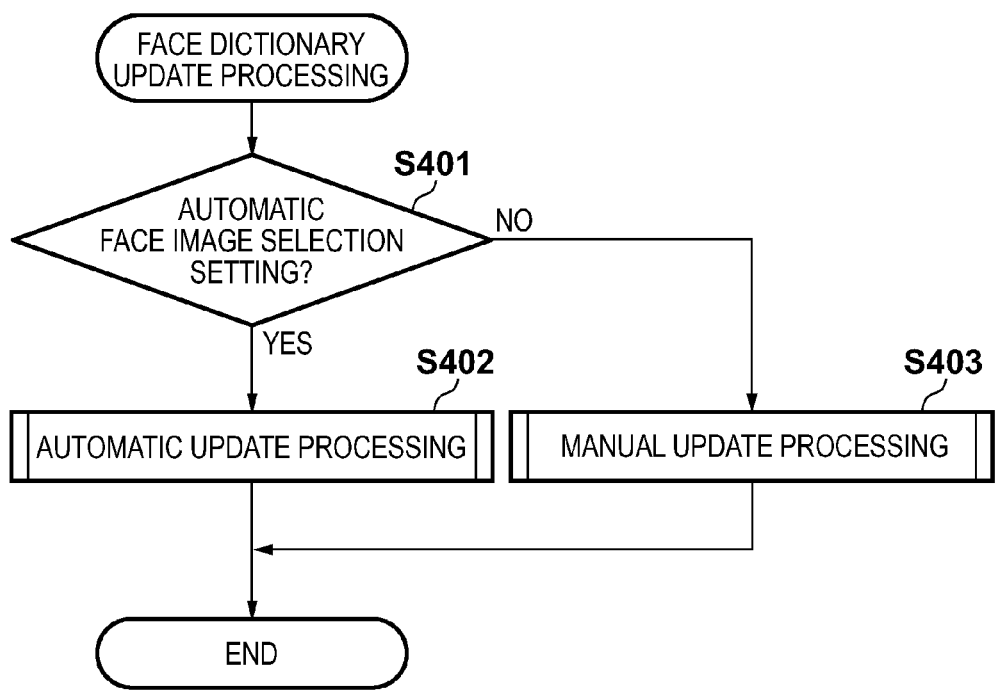
F I G. 4

FIG. 7
CAMERA-SIDE FACE DICTIONARY MANAGEMENT FILE
CURRENT FACE DICTIONARY
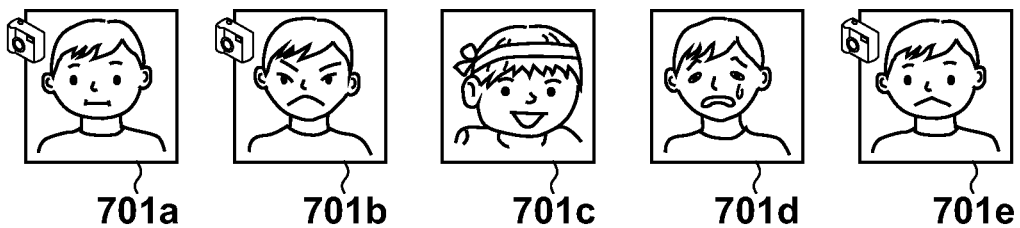
701a　　　701b　　　701c　　　701d　　　701e
PC-SIDE FACE DICTIONARY MANAGEMENT FILE
LAST UPDATE FACE DICTIONARY
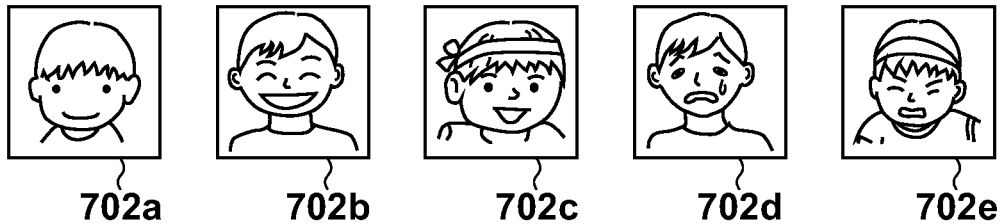
702a　　　702b　　　702c　　　702d　　　702e
FACE IMAGES TO BE INCLUDED IN UPDATE FACE DICTIONARY
NEWEST UPDATE FACE DICTIONARY
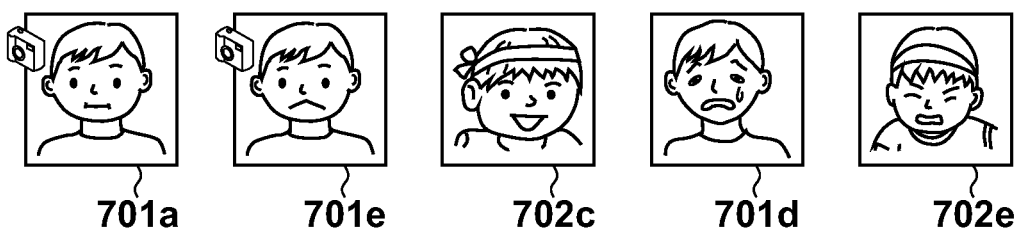
701a　　　701e　　　702c　　　701d　　　702e
EXTERNAL RECORDED IMAGE WHICH WILL DISAPPEAR AFTER UPDATING
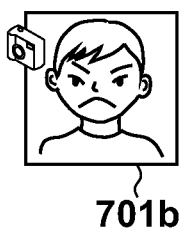
701b FIG. 9
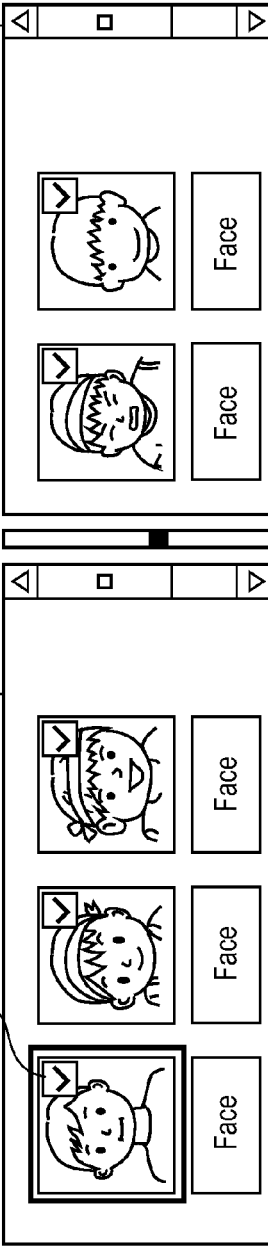
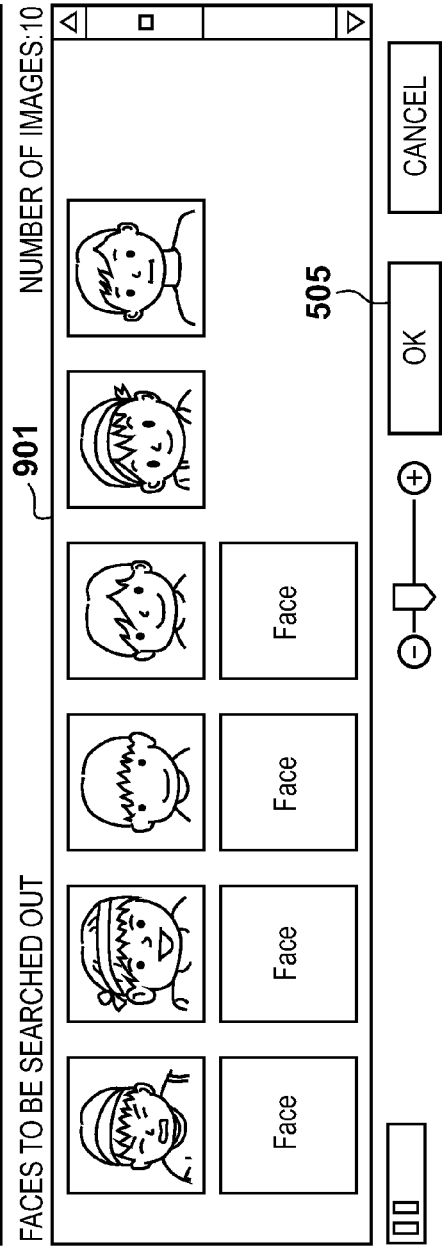

FIG. 13A

1300 FACE DICTIONARY FILE

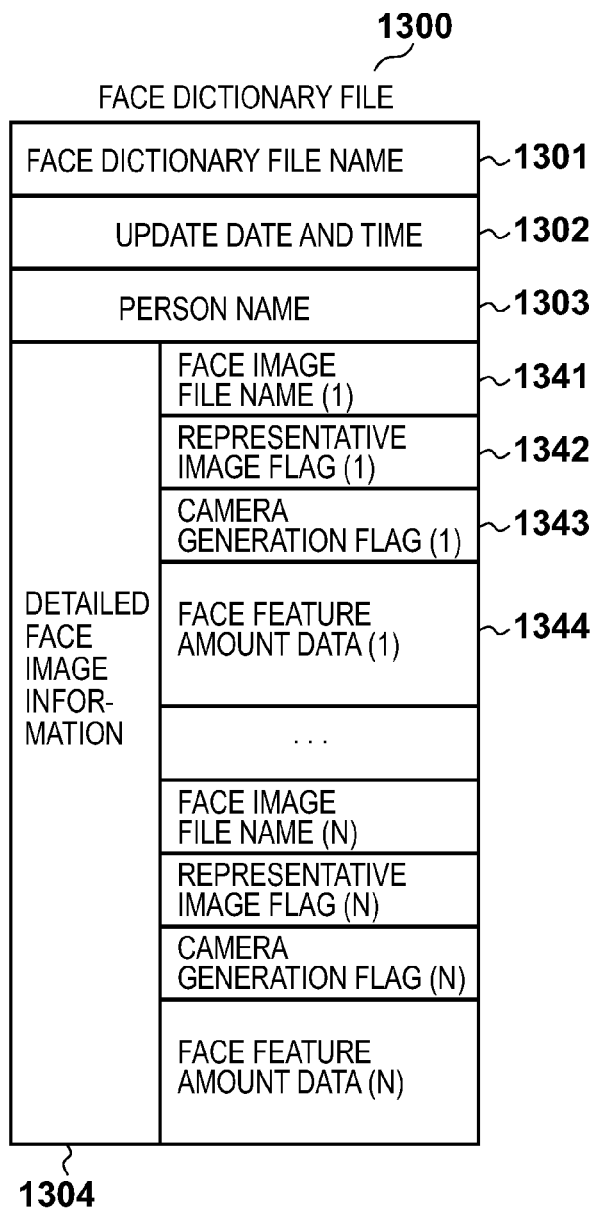

| FACE DICTIONARY FILE NAME | ~1301 |
| UPDATE DATE AND TIME | ~1302 |
| PERSON NAME | ~1303 |

DETAILED FACE IMAGE INFORMATION (1304):
- FACE IMAGE FILE NAME (1) ~1341
- REPRESENTATIVE IMAGE FLAG (1) ~1342
- CAMERA GENERATION FLAG (1) ~1343
- FACE FEATURE AMOUNT DATA (1) ~1344
- ...
- FACE IMAGE FILE NAME (N)
- REPRESENTATIVE IMAGE FLAG (N)
- CAMERA GENERATION FLAG (N)
- FACE FEATURE AMOUNT DATA (N)

FIG. 13B

1320 FACE IMAGE FILE

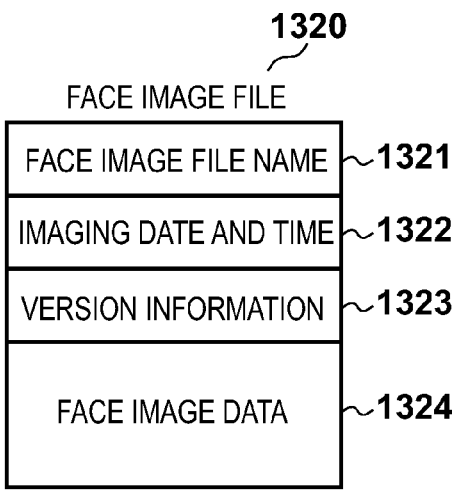

| FACE IMAGE FILE NAME | ~1321 |
| IMAGING DATE AND TIME | ~1322 |
| VERSION INFORMATION | ~1323 |
| FACE IMAGE DATA | ~1324 |

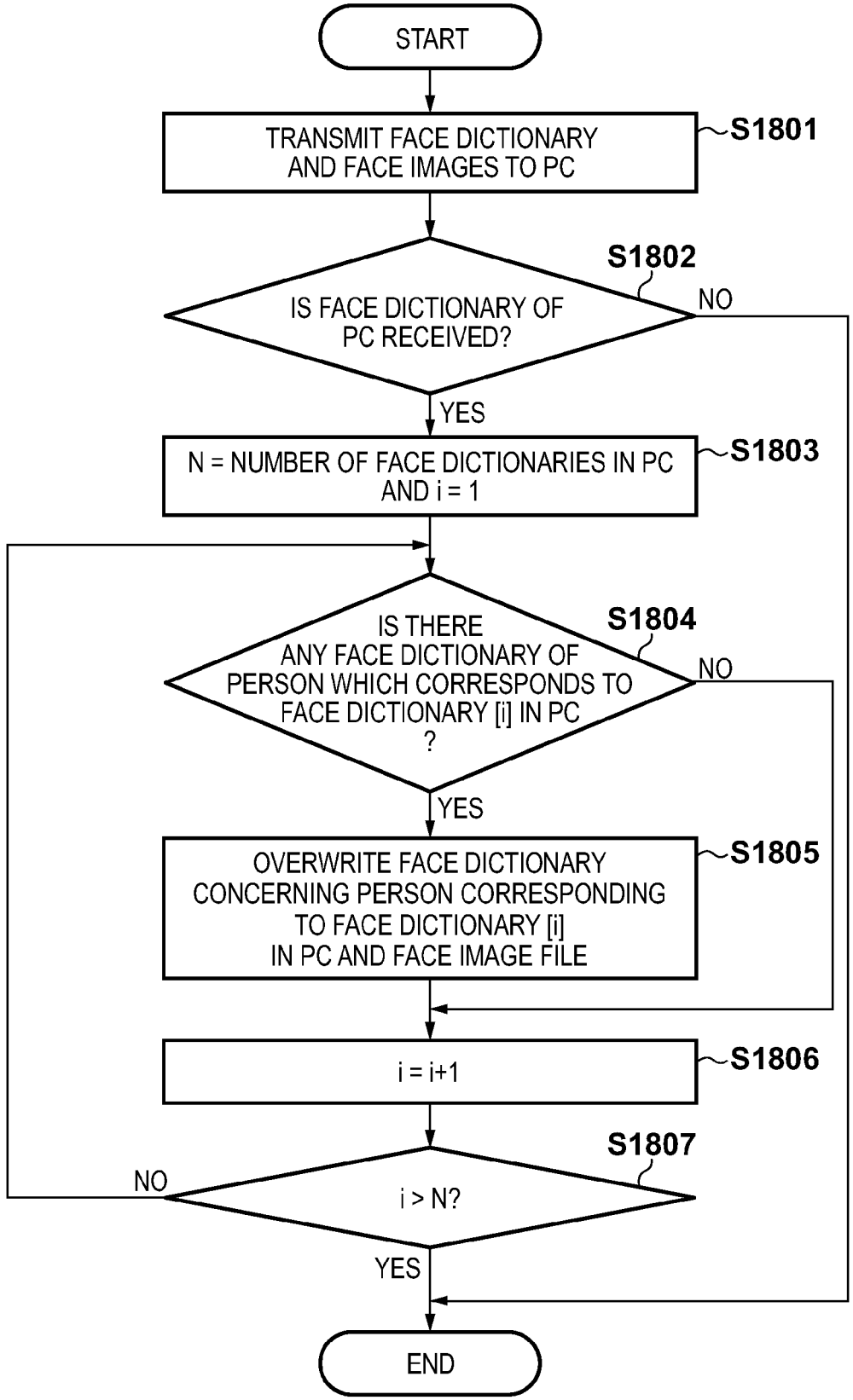

INFORMATION PROCESSING APPARATUS INCLUDING A FACE DICTIONARY, CONTROL METHOD THEREFOR, AND STORAGE MEDIUM

BACKGROUND OF THE INVENTION

1. Field of the Invention

The present invention relates to an information processing apparatus, a control method for the apparatus, and a storage medium, and particularly to a technique of processing face images included in images.

2. Description of the Related Art

Conventionally, there has been disclosed an imaging apparatus which specifies a person concerning a face image included in a captured image by performing face recognition processing for the captured image, generates a face record file in which information indicating the specified person is associated with the face image, and provides the file to an external apparatus (see Japanese Patent Laid-Open No. 2008-278350).

Some PCs (Personal Computers) installed with application software equipped with a face recognition function store a face image of a specific person included in an image in a predetermined database and search for images including the specific person based on the face image.

In general, the capacity of the storage area of an imaging apparatus is smaller than that of a PC. In addition, the storage area of the imaging apparatus is used with top priority being given to imaging processing.

In addition, since the faces of persons generally change due to temporal factors such as age, the accuracy of searching for images including a specific person decreases as stored face images become old. For this reason, the search accuracy is improved by adding new face images and updating old face images.

As described above, however, since the capacity of the storage area of the imaging apparatus is small, in order to ensure a capacity to store new face images, it is necessary to delete existing face images.

On the other hand, the face images generated by the user taking with an imaging apparatus are generally more important than the face images generated by third parties which the user has acquired via the Internet and the like. That is, when a face image obtained by the user by performing imaging operation using an imaging apparatus disappears to store a new face image, troubles arise. For example, when the user wants to use the face image previously captured by himself/ herself, he/she needs to generate a similar face image by imaging the same person. If the face image which has disappeared is old, it is difficult to image the same person. In some cases, therefore, he/she cannot generate a similar face image.

SUMMARY OF THE INVENTION

The present invention has been made in consideration of such a conventional problem. The present invention provides an information processing apparatus which can prevent the disappearance of the face images generated by an imaging apparatus, a control method for the apparatus, and a storage medium.

The present invention in its first aspect provides an information processing apparatus comprising: a generation unit configured to generate, for each person, a first face dictionary storing face data concerning a face of the person included in an image; a reception unit configured to receive a second face dictionary storing face data of a person corresponding to the first face dictionary from an imaging apparatus, the second face dictionary being updated by the imaging apparatus based on face data of the person included in an image obtained by the imaging apparatus; a storage unit configured to store the face data stored in the received second face dictionary in a predetermined storage device; and a transmission unit configured to transmit the first face dictionary to the imaging apparatus when an update date and time of the second face dictionary is older than a date and time of the first face dictionary, the second face dictionary being overwritten with the transmitted first face dictionary in the imaging apparatus, wherein the transmission unit does not transmit the first face dictionary to the imaging apparatus if the first face dictionary includes face data of the person included in an image captured outside of a predetermined period.

Further features of the present invention will become apparent from the following description of exemplary embodiments (with reference to the attached drawings).

BRIEF DESCRIPTION OF THE DRAWINGS

FIGS. 3A and 3B are views exemplifying the data structures of a face dictionary and face dictionary management file according to the first embodiment of the present invention;

FIG. 4 is a flowchart exemplifying face dictionary update processing according to the first embodiment of the present invention;

FIG. 7 is a view for explaining external recorded face images made to disappear by updating according to the first embodiment of the present invention;

FIG. 9 is a view for explaining a function of simulating the face recognition processing result obtained by using selected face images according to the first embodiment of the present invention;

FIGS. 13A and 13B are views showing the data structures of a face dictionary and face image file according to the second embodiment of the present invention;

FIG. 18 is a flowchart exemplifying the operation of an imaging apparatus according to the second embodiment of the present invention.

DESCRIPTION OF THE EMBODIMENTS

[First Embodiment]

Exemplary embodiments of the present invention will be described in detail below with reference to the accompanying drawings. Note that an embodiment to be described below will exemplify a case in which the present invention is applied to a PC, as an example of an information processing apparatus, which can generate a face recognition library (face dictionary) used for face recognition processing by an imaging apparatus 200 as an external apparatus. However, the present invention can be applied to an arbitrary device which can generate a face dictionary.

In this specification, the present invention will be described by using the terms defined below:

face dictionary: a face recognition library which includes one or more face images of one person and the data of the feature amount of the face region included in each face image and is used for matching processing in face recognition processing. Assume that the number of face images to be included in each face dictionary or a maximum file size is determined in advance. That is, a face dictionary may not include all the face images managed concerning a target person. A PC 100 which manages face images in this embodiment generates face dictionaries to be held by the imaging apparatus 200.

update face dictionary: a face dictionary concerning an update target person and generated by the PC 100 for updating of a face dictionary. The PC 100 holds information indicating a face image included in an update face dictionary, together with a face dictionary management file (to be described later) after updating.

automatic updating: generating an update face dictionary constituted by a face image group selected from all the face images concerning a target person managed by the PC 100, which include face images of the target person imaged by a camera and recorded in a face dictionary, according to a preset condition, and updating face images held by the imaging apparatus 200.

manual updating: generating an update face dictionary constituted by a face image group selected by the user and updating face images held by the imaging apparatus 200.

a face dictionary management file: a file to be generated for the management of all the face dictionaries held by the imaging apparatus 200 or all the face dictionaries output to the imaging apparatus 200 upon updating. When a face dictionary is to be updated, the face dictionary management files held by the respective apparatuses are compared to select face images to be included in an update face dictionary and determine whether to store the face images in the PC 100. This embodiment will be described on the assumption that a face dictionary management file includes the information of face dictionaries of all the persons to be managed. However, this apparatus may include one face dictionary management file per face dictionary of each person.

<Arrangement of PC 100>

Figure 1:
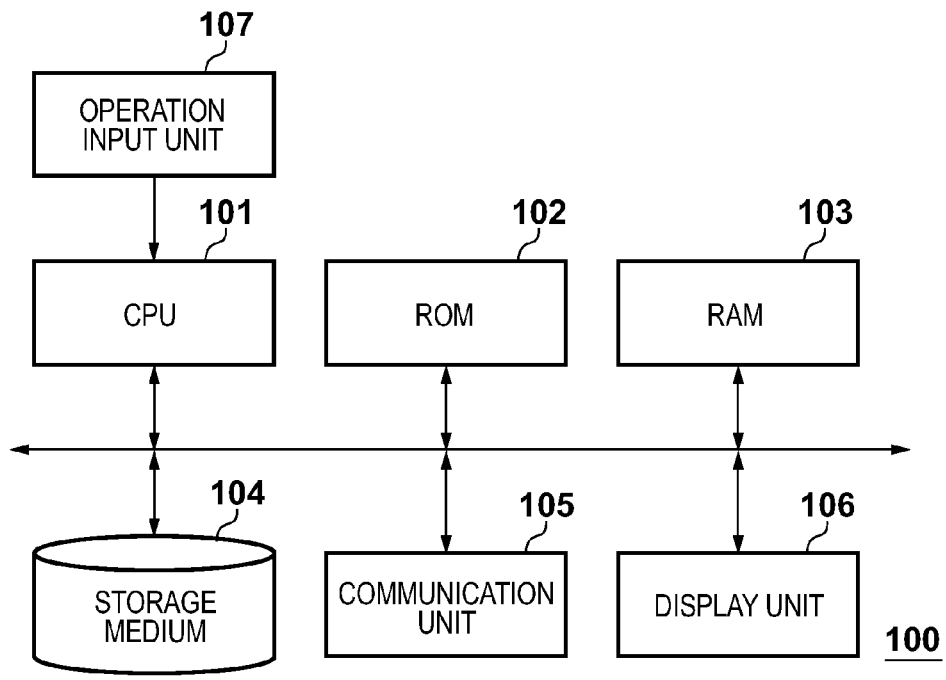
FIG. 1 is a block diagram showing the functional arrangement of a PC 100 according to an embodiment of the present invention.

FIG. 1 is a block diagram showing the functional arrangement of the PC 100 according to the embodiment of the present invention.

A CPU 101 controls the operation of each lock of the PC 100. More specifically, the CPU 101 reads out an operation program for a face dictionary update application stored in, for example, a storage medium 104, and executes the program upon expanding it in a RAM 103, thereby controlling the operation of each block.

A ROM 102 is, for example, a rewritable nonvolatile memory, and stores parameters and the like required for the operation of each block of the PC 100. Although this embodiment will be described on the assumption that the storage medium 104 stores an operation program associated with update processing for a face dictionary, the embodiment may be configured to store the program in the ROM 102.

The RAM 103 is a volatile memory, which is used not only as an expansion area for an operation program for a face dictionary update application and other operation programs but also as a storage area for storing intermediate data output by the operation of each block of the PC 100.

The storage medium 104 is a storage device, such as an HDD or SDD, which is detachably connected to the PC 100. In this embodiment, the storage medium 104 stores one or more face images obtained by imaging each person and used for the generation of a face dictionary and the feature amount of the face region included in each face image, in addition to the operation program for the face dictionary update application. That is, a partial area in the storage medium 104 functions as a face image database which stores face images associated with each person and the feature amount of the face region included in each face image. The storage medium 104 also stores the above face dictionary management file (PC-side face dictionary management file). The PC-side face dictionary management file stored in the storage medium 104 includes the information of an update face dictionary when a face dictionary in the imaging apparatus 200 connected to the PC 100s updated.

A communication unit 105 is a communication interface which transmits/receives data to/from an external apparatus of the PC 100. The imaging apparatus 200 as an external apparatus is connected to the PC 100 via the communication unit 105 either by wired connection using, for example, a USB (Universal Serial Bus) cable or by wireless connection using a wireless LAN. It is possible to use, for example, a PTP (Picture Transfer Protocol) or MTP (Media Transfer Protocol) as a protocol for data communication between the PC 100 and the imaging apparatus 200.

A display unit 106 is a display device such as an LCD connected to the PC 100. This embodiment will exemplify the arrangement in which the display unit 106 is included in the PC 100. However, it can be readily understood that the display unit 106 may be an external display device connected to the PC 100. In the embodiment, the display unit 106 displays the display screen generated by using GUI data concerning the face dictionary update application.

An operation input unit 107 is a user interface of the PC 100 and includes input devices such as a mouse and a keyboard. Upon detecting that the user has operated an input device, the operation input unit 107 generates a control signal corresponding to the operation contents and transmits the signal to the CPU 101.

<Arrangement of Imaging Apparatus 200>

The functional arrangement of the imaging apparatus 200 according to the embodiment of the present invention will be described with reference to FIG. 2.

A camera CPU 201 controls the operation of each block of the imaging apparatus 200. More specifically, the camera CPU 201 reads out an operation program for imaging processing and the like from a camera ROM 202, and controls the operation of each block by expanding the program in the camera RAM (not shown).

The camera ROM 202 is, for example, a rewritable nonvolatile memory, and stores parameters and the like required for the operation of each block of the imaging apparatus 200, in addition to the operation program for imaging processing and the like.

A camera imaging unit 203 is constituted by an imaging optical system, an image sensor such as a CCD or a CMOS sensor, an A/D conversion unit, and the like. The camera imaging unit 203 photoelectrically converts an optical image formed on the image sensor, and outputs the image having undergone various types of image processing including A/D conversion processing.

A camera storage medium 204 is an embedded memory of the imaging apparatus 200 or a storage device such as a memory card or an HDD which is detachably connected to the imaging apparatus 200. In this embodiment, the camera storage medium 204 stores the images captured by imaging processing and face dictionaries which are referred to in face recognition processing in the imaging apparatus 200. The face dictionaries to be stored in the camera storage medium 204 are not limited to those generated by the face dictionary management application executed by the PC 100 and may be those generated by recording the face images obtained by imaging in the imaging apparatus 200. The camera storage medium 204 also stores a face dictionary management file (camera-side face dictionary management file) which manages the face dictionaries stored in the camera storage medium 204. Although this embodiment will be described on the assumption that the camera storage medium 204 stores face dictionaries and a face dictionary management file, the present invention is not limited to this. For example, face dictionaries and a face dictionary management file may be stored in an area, such as the camera ROM 202, which can be accessed by the face dictionary management application of the PC 100 or allows to write upon reception of a file write request. This embodiment may be configured to make the camera CPU 201 store face dictionaries and a face dictionary management file in a predetermined storage area when the dictionaries and file are transmitted from the PC 100.

A camera communication unit 205 is a communication interface which transmits and receives data to and from an external apparatus of the imaging apparatus 200. Assume that in this embodiment, the communication interface of the camera communication unit 205 is a communication interface capable of data communication with the communication unit 105 of the PC 100 by using the same protocol.

A camera display unit 206 is a display device such as a compact LCD of the imaging apparatus 200. The camera display unit 206 displays the images output from the camera imaging unit 203 upon imaging operation, the images stored in the camera storage medium 204, and the like.

A camera operation input unit 207 is a user interface of the imaging apparatus 200 and includes operation members such as a power button and a shutter button. Upon detecting that the user has operated an operation member, the camera operation input unit 207 generates a control signal corresponding to the operation contents and transmits the signal to the camera CPU 201.

<Data Structures of Face Dictionary and Face Dictionary Management File>

The data structures of a face dictionary and face dictionary management file (on the PC side and the camera side) according to this embodiment respectively stored in the storage medium 104 and the camera storage medium 204 will be described with reference to FIGS. 3A and 3B.

As described above, the PC 100 and the imaging apparatus 200 respectively have different face dictionary management files. The PC-side face dictionary management file manages information concerning the face images included in the update face dictionary generated upon automatic or manual updating. The camera-side face dictionary management file manages information concerning the face images included in the face dictionaries stored in the camera storage medium 204 of the imaging apparatus 200. That is, the camera-side face dictionary management file in the imaging apparatus 200 changes when, for example, the face image captured by the imaging apparatus 200 is recorded in a face dictionary. On the other hand, the PC-side face dictionary management file in the PC 100 holds information concerning the update face dictionary generated at the time of previous updating operation until the face dictionary update application executes face dictionary update processing while the PC 100 is connected to the imaging apparatus 200. That is, the face dictionary management files in the PC 100 and the imaging apparatus 200 are face dictionary management files having the same information immediately after the execution of face dictionary update processing. However, the face dictionary management files in the PC 100 and the imaging apparatus 200 differ from each other when new face images are recorded in the imaging apparatus 200 upon execution of face dictionary update processing.

(Data Structure of Face Dictionary)

The data structure of a face dictionary concerning one target person will be described first with reference to FIG. 3A.

A face dictionary concerning one target person is constituted by a person name 301 identifying the target person and detailed information (face image information (1), face image information (2), . . . , face image information (N)) concerning each of one or more face images concerning the target person included in the face dictionary. Face image information (1) 302 which is detailed information concerning one face image includes:

1. feature amount data (1) 303 of the face region included in the face image; and
2. a camera generation flag (1) 304 (boolean type) indicating whether the face image is a face image (external recorded face image) recorded in the imaging apparatus 200.

A method of selecting face images to be included in a face dictionary will be described in detail in the later description of face dictionary update processing.

(Data Structure of Face Dictionary Management File)

The data structure of a face dictionary management file will be described next with reference to FIG. 3B. Assume that the CPU 101 or the camera CPU 201 generates, in the respective apparatuses, face dictionary management files when, for example, a face dictionary is generated or changed.

In this embodiment, a face dictionary management file 310 is data for managing information concerning all the face dictionaries held by the imaging apparatus 200. More specifically, as shown in FIG. 3B, information concerning one face dictionary (1) 311 in the face dictionary management file 310 includes:

1. a face dictionary file name (1) 312 indicating the face dictionary;
2. an update date and time (1) 313 when the face dictionary was updated; and
3. detailed information (detailed face image information (1-1) 314, detailed face image information (1-2) 320, . . . , detailed face image information (1-N) 330) of each face image included in the face dictionary.

Each piece of detailed face image information included in the face dictionary, for example, the detailed face image information (1-1) 314, includes:
1. a face image file name (1-1) 315 which is identification information of the face image and stored in the storage medium 104;
2. an imaging date and time (1-1) 316 when the face image was captured;
3. a camera generation flag (1-1) 317 (boolean type) indicating whether the face image is an external recorded image; and
4. a representative image flag (1-1) 318 (boolean type) indicating whether the face image is set as a representative image of the face dictionary.

<Face Dictionary Update Processing>

Face dictionary update processing by the PC 100 according to this embodiment having the above arrangement will be concretely described with reference to the flowchart of FIG. 4. It is possible to implement the processing corresponding to the flowchart by, for example, making the CPU 101 read out a corresponding processing program stored in the storage medium 104 and executing the program upon expanding it in the RAM 103. Assume that in the following description, the CPU 101 starts this face dictionary update processing upon, for example, determining that the user has issued an instruction to update the face dictionary concerning one target person, in the face dictionary update application executed in the PC 100.

In step S401, the CPU 101 determines whether automatic selection setting has been made for face images to be included in the face dictionary of a target person. More specifically, the CPU 101 refers to, for example, the face image selection setting information included in the face dictionary update setting stored in the RAM 103 to determine whether the face image selection setting is automatic selection setting.

(GUI Example for Face Dictionary Update Application)

The face dictionary update application in this embodiment will be outlined with reference to the GUI used in the application. Assume that the face dictionary update application in this embodiment uses a screen 500 shown in FIG. 5 as a GUI concerning the selection of face images to be included in a face dictionary concerning one target person.

Figure 5:
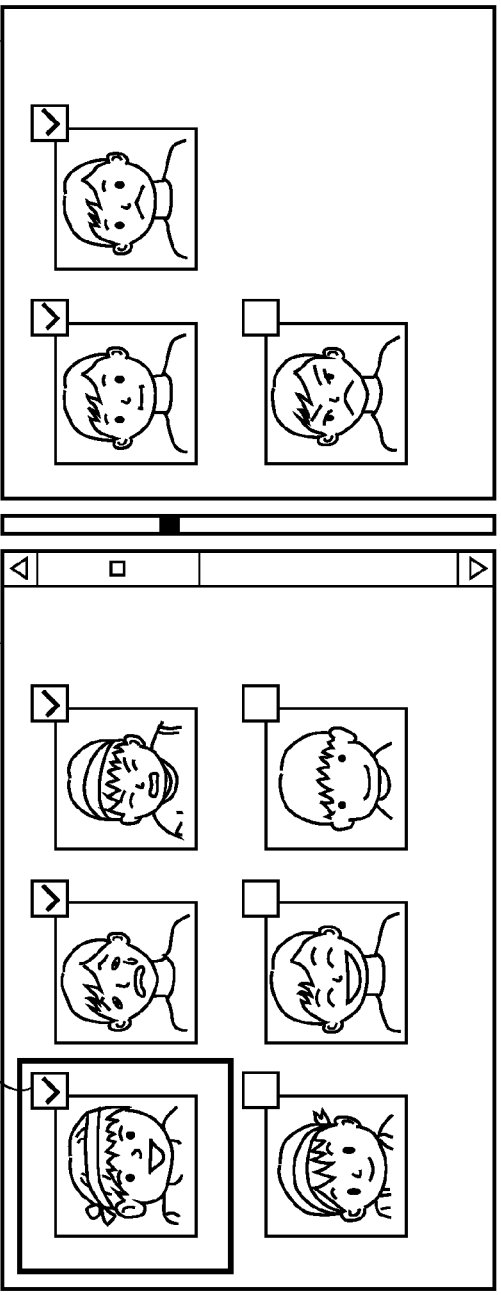
FIG. 5 is a view exemplifying a screen for the selection of face images to be included in a face dictionary in a face dictionary update application according to the first embodiment of the present invention.

As shown in FIG. 5, the user can switch between automatically selecting face images to be included in a face dictionary and manually selecting face images, by changing the state of an automatic selection check box 501 for automatic selection setting for face images, which is written as "automatically optimize". Upon detecting, based on a control signal from the operation input unit 107, that the user has changed the state of the automatic selection check box 501, the CPU 101 changes the state of the automatic selection setting for face images stored in the RAM 103.

When not performing automatic selection of face images to be included in a face dictionary, the user can select arbitrary face images from the face images recorded in the face image database of the storage medium 104 and include the face images in the face dictionary. The face images recorded in the face image database of the storage medium 104 are displayed as a PC recorded face image list 502 and a camera recorded face image list 503 in reverse chronological order of imaging dates and times. The camera recorded face image list 503 displays a list of the face images (external recorded face images) recorded in a face dictionary in an external apparatus (the imaging apparatus 200 in this embodiment) other than the PC 100. The PC recorded face image list 502 displays a list of face images out of the face images stored in the face image database of the storage medium 104 except for external recorded face images. By changing the state of a selection check box 504 displayed at the upper left of each face image to the checked state, the user can select the face image as a face image to be included in the face dictionary.

Assume that in this embodiment, the user can select five face images for the face dictionary concerning one target person. Upon detecting, based on a control signal from the operation input unit 107, that the user has issued an instruction to change the selection check box 504 for one face image to the checked state, the CPU 101 changes the selected selection check box 504 to the checked state, if the number of face images which are currently in the checked state is less than five.

While the user has selected no face image, the CPU 101 displays the selection check boxes 504 corresponding to the face images included in the face dictionary concerning the target person at the last updating operation in the checked state. More specifically, the CPU 101 refers to the PC-side face dictionary management file stored in the storage medium 104 to specify the face images included in the face dictionary concerning the target person in the last updating operation, and displays the selection check boxes 504 corresponding to the face images upon changing the states of the check boxes to the checked state. At this time, the CPU 101 controls the selection check boxes 504 corresponding to other face images to the unchecked state.

After the method of selecting face images to be included in the face dictionary or the selection of face images to be included in the face dictionary is complete in this manner, the user can issue a face dictionary update instruction to the CPU 101 by operating an update button 505.

If the CPU 101 determines in step S401 that the user has made the automatic selection setting for face images to be included in the face dictionary concerning the target person, it proceeds the process to step S402. Otherwise, the CPU 101 proceeds the process to the step S403.

In step S402, the CPU 101 executes the automatic update processing of automatically selecting face images to be included in the face dictionary concerning the target person according to a preset condition, and completes the face dictionary update processing.

(Automatic Update Processing)

Figure 6:
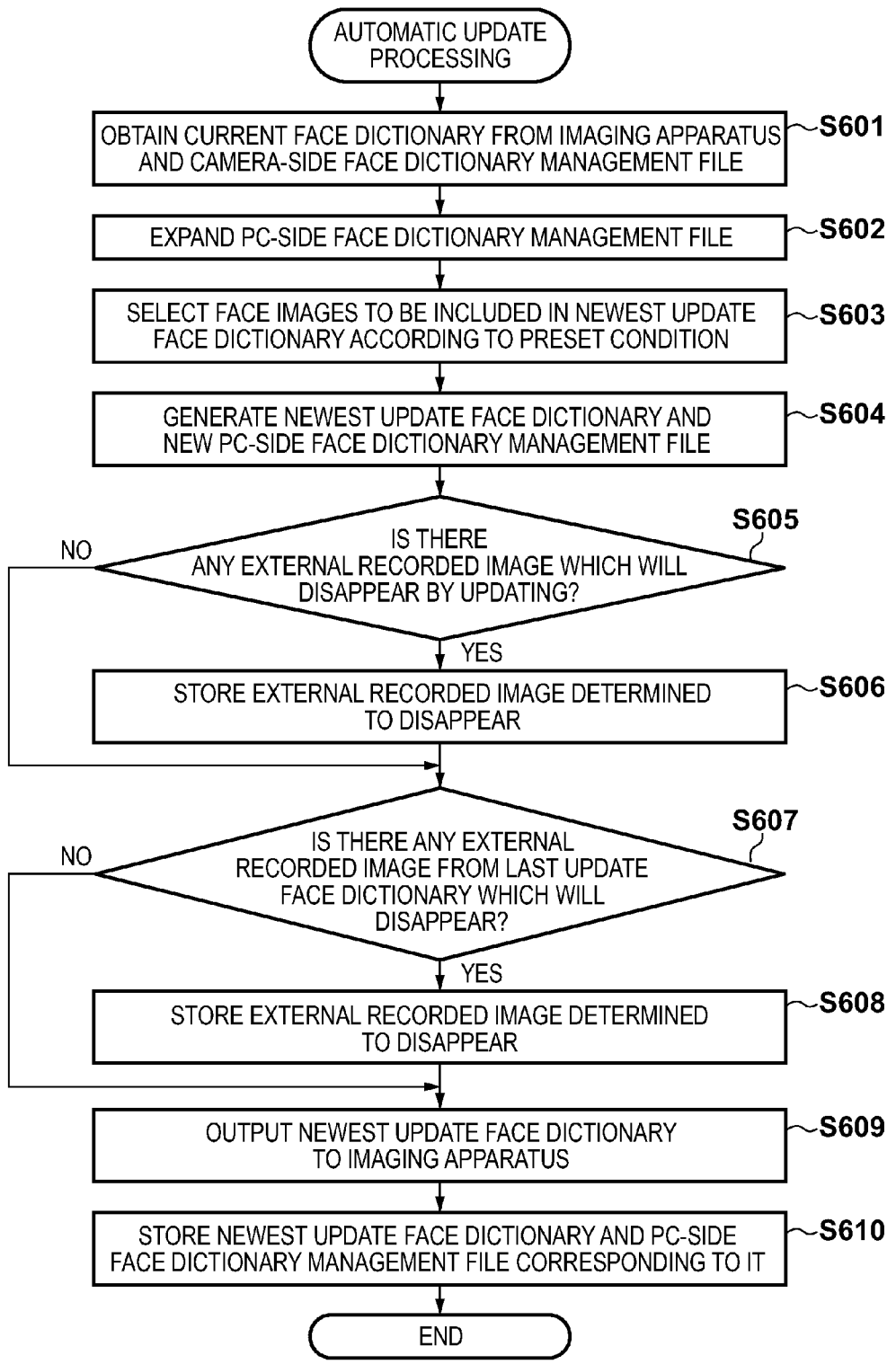
FIG. 6 is a flowchart exemplifying automatic update processing according to the first embodiment of the present invention.

Automatic update processing by the PC 100 according to this embodiment will be described in detail with reference to FIG. 6.

In step S601, the CPU 101 obtains a face dictionary and a camera-side face dictionary management file from the camera storage medium 204 of the imaging apparatus 200. As for a method of obtaining the face dictionary and the camera-side face dictionary management file, for example, the CPU 101 may transmit a transmission request command for the file to the imaging apparatus 200 via the communication unit 105, and receive the file as a response to the request. Alternatively, for example, when the PC 100 is USB-connected to the imaging apparatus 200, the CPU 101 may directly obtain the camera-side face dictionary management file from the camera storage medium 204 recognized as an externally-connected storage. The CPU 101 then expands the obtained camera-side face dictionary management file in the RAM 103.

In step S602, the CPU 101 reads out the PC-side face dictionary management file stored in the storage medium 104 and expands it in the RAM 103 in the same manner as described above.

In step S603, the CPU 101 selects (automatically selects) face images to be included in an update face dictionary concerning the target person according to a preset condition. This embodiment is configured to select, out of the face images of the target person, a predetermined number (five) of face images to be included in the update face dictionary in increasing order of the differences between the current date and time and the imaging dates and times, that is, in reverse chronological order of imaging dates and times. Assume that as a preset condition in the face image update application according to this embodiment, there is set a condition for selecting top five face images arranged in reverse chronological order of imaging dates and times out of the face images of the target person. However, the selection condition for face images to be included in an update face dictionary is not limited to imaging dates and times. It is possible to set other conditions such as a condition for selecting face images corresponding to peak values of the distribution of quantized feature amounts and a condition for selecting face images in decreasing order of matching counts in face recognition processing.

The CPU 101 refers to the camera-side face dictionary management file and the PC-side face dictionary management file expanded in the RAM 103. The CPU 101 then selects, as face images to be included in the newest update face dictionary <a newest update face archive>, top five face images in reverse chronological order of the imaging dates and times out of the face images included in the face dictionary (the current face dictionary <a current face archive>) currently held by the imaging apparatus 200 and the face dictionary (the last update face dictionary <a last update face archive>) output from the PC to the imaging apparatus 200. The CPU 101 stores the information indicating the face images selected as the face images to be included in the newest update face dictionary in, for example, the RAM 103.

Consider a case in which the face images included in the camera-side face dictionary management file and the PC-side face dictionary management file expanded in the RAM 103 are face images 701a to 701e and face images 702a to 701e shown in FIG. 7. Referring to FIG. 7, the camera icons at the upper left of the face images indicate the external recorded face images 701a, 701b, and 701e out of the face images included in the current face dictionary. The CPU 101 can determine, by referring to the camera generation flag of each face image included in the face image management file, whether the face image is an external recorded face image.

At this time, the CPU 101 selects top five face images in reverse chronological order of imaging dates and times by referring to the information of the imaging dates and times of the face images 701a to 701e and face images 702a to 702e which are included in the camera-side face dictionary management file or the PC-side face dictionary management file. In the case shown in FIG. 7, the face images 701d and 702d are identical face images. By referring to the information of the face dictionary file name included in the face dictionary management file, the CPU 101 can determine whether the current face dictionary and the last update face dictionary include identical face images. Upon determining the presence of identical face images, the CPU 101 selects face images from the face images obtained by merging the identical face images to be included in the update face dictionary. Assume that in the case of FIG. 7, the CPU 101 selects, as face images to be included in the update face dictionary, the face images 701a, 701d, 701e, 702c, and 702e from the nine face images, which are top face images in reverse chronological order of imaging dates and times.

This embodiment will be described on the assumption that the CPU 101 selects face images included in the newest update face dictionary from the face images included in the current face dictionary and the last update face dictionary. However, the present invention is not limited to this. Consider, for example, a case in which after the PC 100 outputs the last update face dictionary to the imaging apparatus 200, new face images are recorded in the face image database of the storage medium 104. In this case, the CPU 101 may select a predetermined number of face images in reverse chronological order of imaging dates and times from the face images included in the database every time the face image database is changed, generates a next PC-side face dictionary management file for updating, and uses it in place of the last update face dictionary.

This embodiment will exemplify a method of providing and comparing a PC-side face dictionary management file and a camera-side face dictionary management file to reduce the processing load in this step. However, the PC 100 may perform the following operation to include the newest face images held in the face image database in the newest update face dictionary. That is, in this step, the CPU 101 selects a predetermined number of face images, according to a predetermined condition, from the face images included in the current face dictionary and all the face images of the target person recorded in the face image database of the storage medium 104.

In step S604, the CPU 101 obtains the information of the face images selected in step S603 from the face image database and the current face dictionary obtained from the imaging apparatus 200 in step S601, and generates the newest update face dictionary in the RAM 103. At this time, the CPU 101 generates a new PC-side face dictionary management file corresponding to the newest update face dictionary in the same manner as described above separately from the PC-side face dictionary management file currently stored in the storage medium 104.

In step S605, the CPU 101 determines whether any of external recorded face images included in the current face dictionary will disappear by updating of the newest update face dictionary. More specifically, the CPU 101 refers to the camera-side face dictionary management file expanded in the RAM 103 and the new PC-side face dictionary management file generated in step S604. The CPU 101 then determines that out of the external recorded face images included in the current face dictionary, face images which are not included in the newest update face dictionary will disappear. If the CPU 101 determines that any of the external recorded face images will disappear, it proceeds the process to step S606. Otherwise, the CPU 101 proceeds the process to step S607.

In step S606, the CPU 101 copies the face images, out of the external recorded face images included in the current face dictionary, which are determined to disappear, and stores them in the face image database of the storage medium 104. More specifically, concerning the face images which will disappear, the CPU 101 obtains the feature amount data of the face regions included in the face images and the camera generation flags of the face images from the face dictionary obtained in step S601. The CPU 101 stores the feature amount data and camera generation flags of the face images which will disappear, as face images of the target person, in the face image database of the storage medium 104 in association with the face images. In the case of FIG. 7, the CPU 101 stores, in the face image database, the face image 701b, out of the external recorded face images 701a, 701b, and 701e included in the current face dictionary, which is not included in the update face dictionary.

In step S607, the CPU 101 determines whether any of the face images included in the last update face dictionary will disappear upon updating by the newest update face dictionary. More specifically, the CPU 101 refers to the PC-side face dictionary management file expanded in the RAM 103 and the newest PC-side face dictionary management file generated in step S604. The CPU 101 then extracts face images, out of the face images included in the last update face dictionary, which are not included in the newest update face dictionary. In addition, the CPU 101 determines whether out of the extracted face images, face images which are not stored in the face image database of the storage medium 104 exist.

If out of the extracted face images, face images which are not stored in the face image database exist, those face images are external recorded face images included in the last update face dictionary. In this embodiment, as described with reference to step S606, only the external recorded face images determined to disappear upon updating are stored in the face image database. That is, the external recorded face images left in the last update face dictionary without disappearing because they are included in the newest update face dictionary are not stored in the face image database. That is, in order to prevent the external recorded face images which are not included in the current face dictionary but are included in the last update face dictionary from disappearing, the CPU 101 determines in this step whether such face images exist. Assume that in the case of FIG. 7, since all the face images 702a to 702e included in the last update face dictionary are all stored in the face image database and are not external recorded face images, there exist no face images which are determined in this step to disappear.

Note that it is also possible to determine, by referring to the camera generation flags attached to face images, whether the face images are external recorded face images. Therefore, the CPU 101 may determine in step S607 whether out of the face images included in the last update face dictionary, face images whose camera generation flags indicate that they are external recorded face images and which do not exist in the newest update face dictionary exist.

As described above, determining whether out of the face images which are included in the last update face dictionary but are not included in the newest update face dictionary, face images which are not stored in the face image database exist can prevent the disappearance of the face images generated by the imaging apparatus 200 having no function of adding camera generation flags and the face images generated by other PCs 100.

If the CPU 101 determines that out of the external recorded face images included in the last update face dictionary, face images which are not stored in the face image database will disappear upon updating by the newest update face dictionary, it proceeds the process to step S608. Otherwise, the CPU 101 proceeds the process to step S609.

In step S608, as in step S606, the CPU 101 additionally records the face images, out of the external recorded face images included in the last update face dictionary but not included in the face image database, which are determined to disappear in the face image database of the storage medium 104 in the same manner as described above.

In step S609, the CPU 101 outputs the newest update face dictionary to the imaging apparatus 200 via the communication unit 105. This changes the current face dictionary stored in the camera storage medium 204 to the newest update face dictionary. Subsequently, the newest update face dictionary stored in the camera storage medium 204 becomes the current face dictionary, which is sequentially updated by the face images captured by the imaging apparatus 200.

In step S610, the CPU 101 deletes the last update face dictionary and the corresponding PC-side face dictionary management file from the storage medium 104, and stores the newest update face dictionary generated in step S604 and the corresponding new PC-side face dictionary management file in the storage medium 104. Subsequently, the newest update face dictionary stored in the storage medium 104 becomes the last update face dictionary.

The CPU 101 then completes this automatic update processing.

Upon determining in step S401 that no automatic selection setting has been made for face images to be included in the face dictionary concerning the target person, the CPU 101 proceeds the process to step S403. In step S403, the CPU 101 executes the manual update processing of updating the face dictionary in the imaging apparatus 200 by the newest update face dictionary including the face images of the target person which are selected by the user, thus completing this face dictionary update processing.

(Manual Update Processing)

Figure 8:
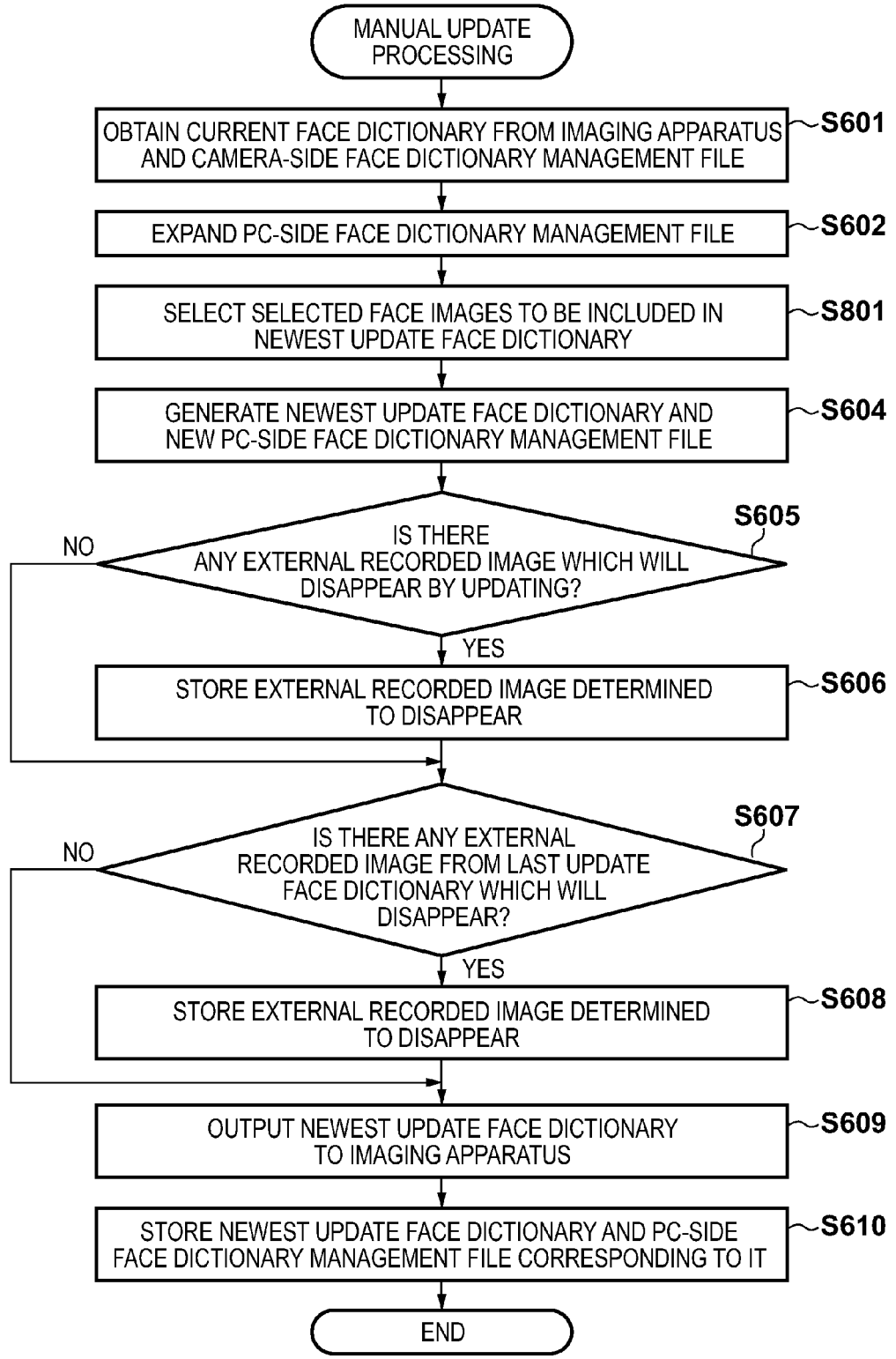
FIG. 8 is a flowchart exemplifying manual update processing according to the first embodiment of the present invention.

Manual update processing by the PC 100 according to this embodiment will be described in detail with reference to FIG. 8. Note that since the same step numbers in this manual update processing denote the same processes as in the above automatic update processing, a description of them will be omitted, and only steps of performing processing characteristic to this embodiment will be described.

Upon reading out the PC-side face dictionary management file in step S602, the CPU 101 proceeds the process to step S801. In step S801, the CPU 101 obtains the information of face images of the target person, selected by the user, as face images to be included in the newest update face dictionary in the RAM 103. The CPU 101 then proceeds the process to step S604.

Generating a newest update face dictionary including the face images of the target person selected by the user in this manner can change the face dictionary stored in the camera storage medium 204 of the imaging apparatus 200.

<Evaluation of Face Dictionary>

When generating a face dictionary including arbitrarily selected face images concerning a target person, the user can arbitrarily set a combination of face images to be included in the face dictionary. When, however, face recognition processing is performed by using the feature amount data of the face regions included in the arbitrarily selected face images, there is a possibility that the result desired by the user may not be obtained, that is, the face of the target person may not be correctly recognized. For this reason, the face dictionary update application according to this embodiment may have a function of simulating in advance what kind of recognition result is obtained when performing face recognition processing by using a given combination of face images.

When the user selects face images to be included in a face dictionary from the PC recorded face image list 502 and the camera recorded face image list 503 as shown in FIG. 9, the CPU 101 obtains feature amount data corresponding to each of the selected face images. The CPU 101 then performs matching processing for the face images recorded in the face image database of the storage medium 104 by using feature amount data corresponding to each selected face image, thereby specifying a face image recognized as the same person's face. Upon performing matching processing for all the face images selected in this manner, the CPU 101 displays the face images recognized as the same person's face in a result list 901.

This allows the user to decide face images to be included in a face dictionary when manually selecting them upon determining whether desired face recognition results can be obtained. Note that it is not necessary to take an aspect of displaying face images recognized as the same person's face. For example, this embodiment may take an aspect of calculating the ratios of face images of the target person included in the face images recognized as the same person's face, and displaying the results as recognition accuracy ratios.

Figure 10:
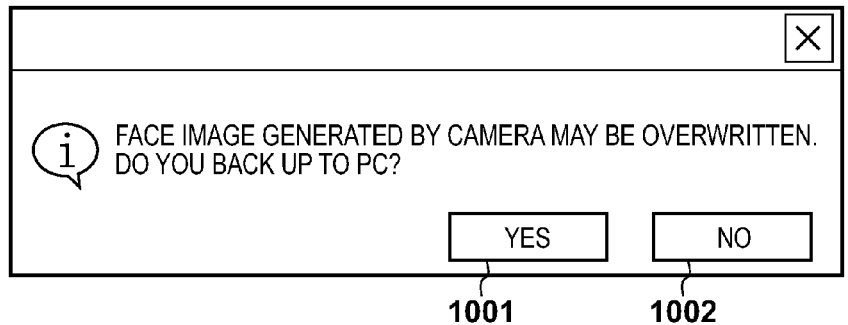
FIG. 10 is a view showing a GUI for the notification of the acknowledgement of storage of external recorded face images made to disappear according to the first embodiment of the present invention.

This embodiment has exemplified the case in which upon determining that external recorded face images which are not stored in the storage medium 104 will disappear by updating operation using an update face dictionary, the CPU 101 automatically stores the face images in the storage medium 104. However, the embodiment of the present invention is not limited to this. For example, as shown in FIG. 10, the CPU 101 may notify the user that the face images recorded in the face dictionary in the imaging apparatus 200 will disappear by updating, and display dialogues for selecting the necessity to the need to store the face images in the storage medium 104. In this case, upon determining that the user has selected a button 1001, the CPU 101 may update the face dictionary after storing the external recorded face images in the storage medium 104. Upon determining that the user has selected a button 1002, the CPU 101 may update the face dictionary without storing the external recorded face images.

The above description has also exemplified the case in which face images to be included in a face dictionary are selected for each target person in the above face dictionary update processing, and the face dictionary is written in the camera storage medium 204 of the imaging apparatus 200. However, the CPU 101 may only generate an update face dictionary upon deciding face images to be included in a face dictionary and store external recorded face images which are not included in the update face dictionary without writing the face dictionary in the camera storage medium 204 in face dictionary update processing. The CPU 101 may write the face dictionary in the camera storage medium 204 in other processing. In this case, there is no need to write a face dictionary in the camera storage medium 204 for each target person.

Figure 11:
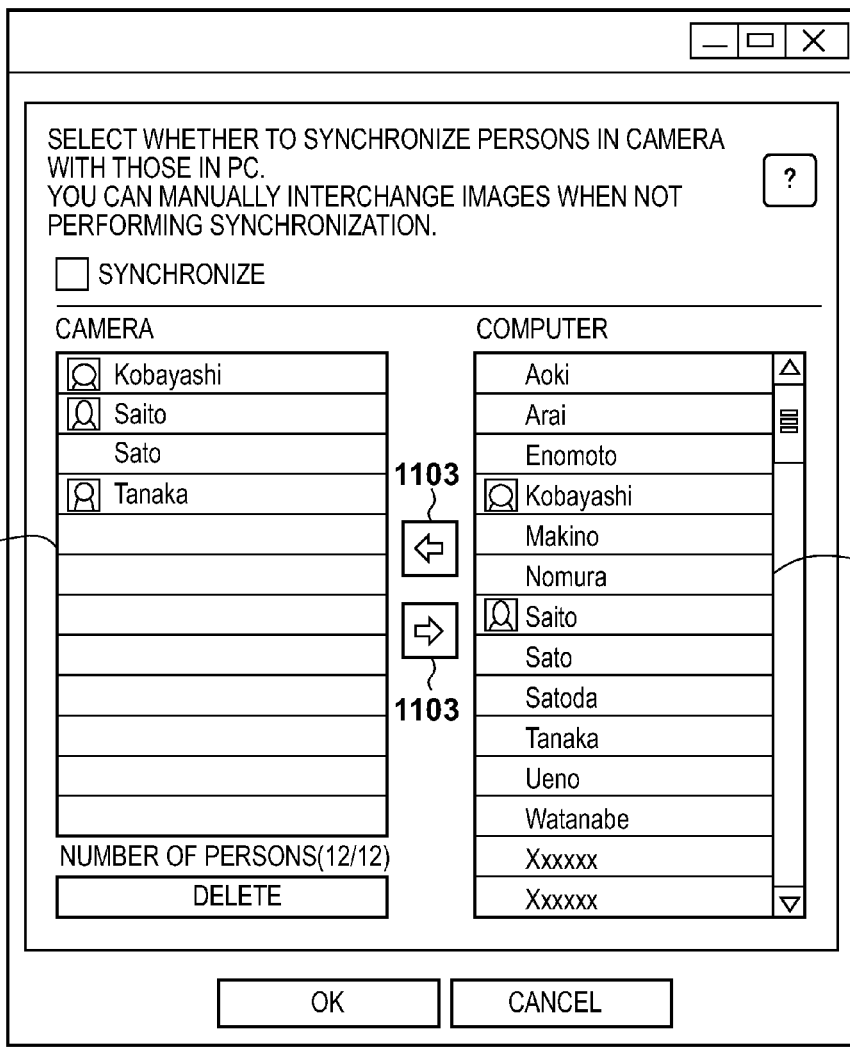
FIG. 11 is a view showing a GUI which is used to set face dictionaries of a plurality of target persons in the imaging apparatus 200 according to the first embodiment of the present invention.

When, for example, the imaging apparatus 200 is to image a plurality of target persons who are known in advance, the user may issue an instruction to write upon deciding a face dictionary to be stored in the camera storage medium 204 according to information indicating persons by using a list like that shown in FIG. 11. In the case shown in FIG. 11, the CPU 101 displays a camera-side list 1101 which lists person names corresponding to face dictionaries written in the camera storage medium 204 of the imaging apparatus 200 and a PC-side list 1102 which lists person names corresponding to face dictionaries stored in the PC 100. By selecting a person whose face dictionary is to be written from the PC-side list 1102 and operating a button 1103, the user can set the face dictionary of the person as a face dictionary to be written in the camera storage medium 204. In addition, by selecting a person whose face dictionary is to be deleted from the camera-side list 1101 and operating a button 1104, the user can set the face dictionary of the person as a face dictionary to be deleted from the camera storage medium 204. By issuing an instruction to update a face dictionary after the above setting, the user can cause the CPU 101 to write the face dictionary of the person corresponding to the CPU 101 in the camera storage medium 204. Note that if the user has set a representative image flag upon deciding a face image set as a representative image out of the face images to be included in the face dictionary at the time of recording of the face dictionary, the CPU 101 may display the face image as the representative image of the corresponding face dictionary on a side of the corresponding person name, as shown in FIG. 11.

As described above, the information processing apparatus according to this embodiment can prevent face images generated by an external apparatus and recorded in a face dictionary from disappearing by updating of the face dictionary. More specifically, the information processing apparatus stores, for each person, one or more face images and the feature amount of the face region included in each face image in the face image database. The information processing apparatus obtains, from an external apparatus, a face recognition library (current face dictionary) concerning a target person, which includes one or more face images of the target person and the feature amount of the face region included in each face image. The information processing apparatus then selects one or more face images, according to a preset condition, from the face images included in the obtained face recognition library and the stored face images concerning the target person, and generates a new face recognition library (newest face dictionary) including the selected face images and the feature amounts of the face regions included in the face images. At this time, the information processing apparatus stores, in the face image database, face images, out of the face images included in the face recognition library (current face dictionary) concerning the target person, which are generated by the external apparatus and recorded in the face recognition library concerning the target person, and the feature amounts of the face regions included in the face images.

With this operation, it is possible to store, in the face image database in the information processing apparatus, face images which will disappear upon integration of the face dictionary, even when the information processing apparatus and the external apparatus change face dictionaries. This makes it possible to include face images stored in the face image database at the time of integration in the face dictionary again, when it is necessary to adjust the face dictionary again because, for example, the face recognition rate is low when executing face recognition processing by using the face dictionary generated by integration.

[Modification]

The embodiment has been described on the assumption that out of the external recorded images included in the current face dictionary in face dictionary update processing, external recorded images which are not included in the newest update face dictionary are recorded in the face image database of the storage medium 104. However, external recorded images to be recorded in the face image database in face dictionary update processing are not limited to those which are not included in the newest update face dictionary, and may be external recorded images which are not recorded in the face dictionary database. That is, it is possible to record the external recorded images included in a face dictionary held by the imaging apparatus 200 and all the feature amounts of the external recorded images in the face image database of the storage medium 104 in face dictionary update processing.

Figure 12:
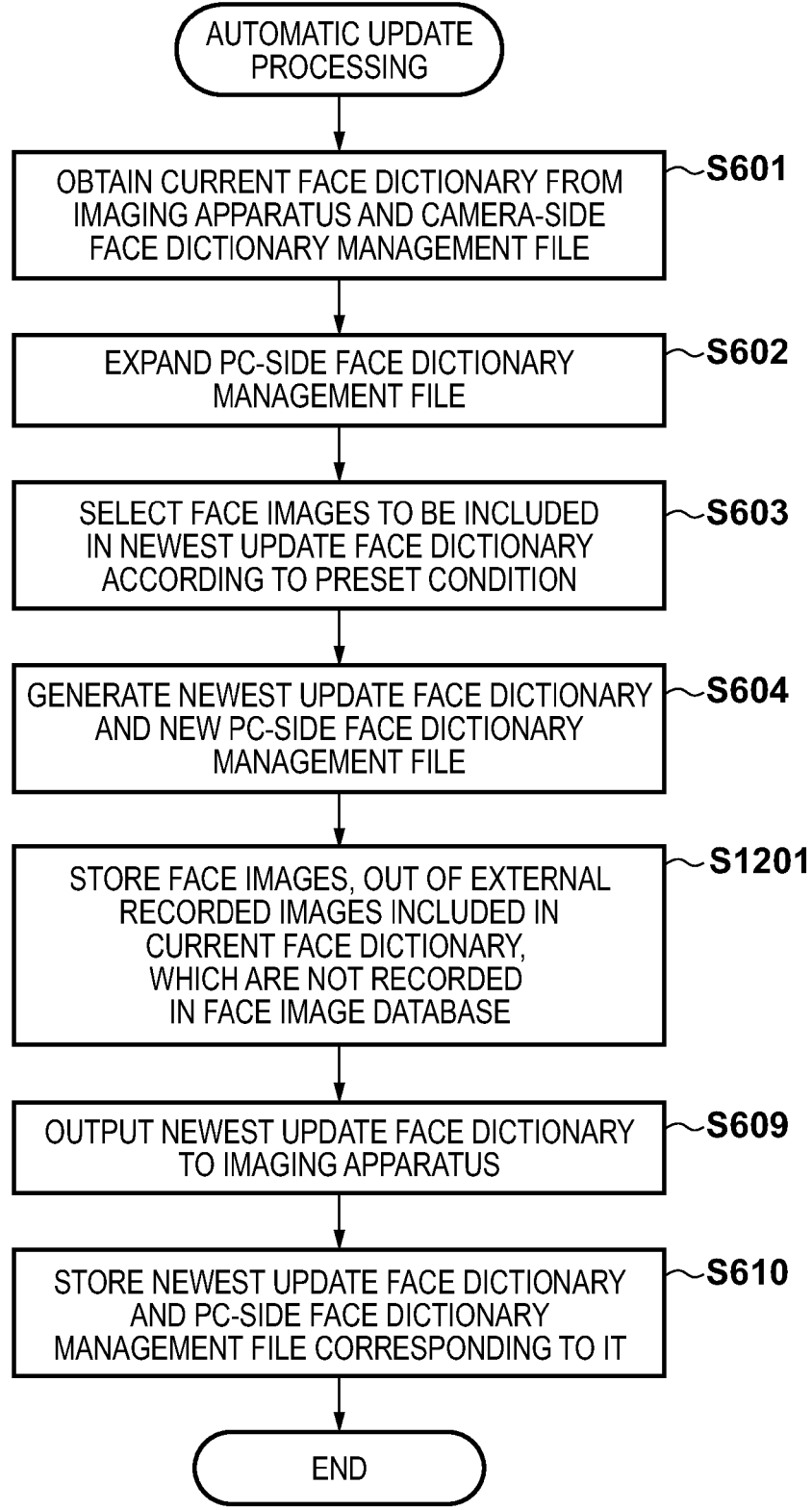
FIG. 12 is a flowchart exemplifying automatic update processing according to a modification of the present invention.

In this case, as shown in FIG. 12, for example, in automatic update processing, the information processing apparatus may record, in step S1201, face images, out of the external recorded images included in a face dictionary currently held by the imaging apparatus 200, which are not recorded in the face image database of the storage medium 104, without performing the processing in steps S605 to S608. This eliminates the necessity to determine whether external recorded images included in a face dictionary which are output to the imaging apparatus 200 will disappear by last updating operation.

[Second Embodiment]

Figure 2:
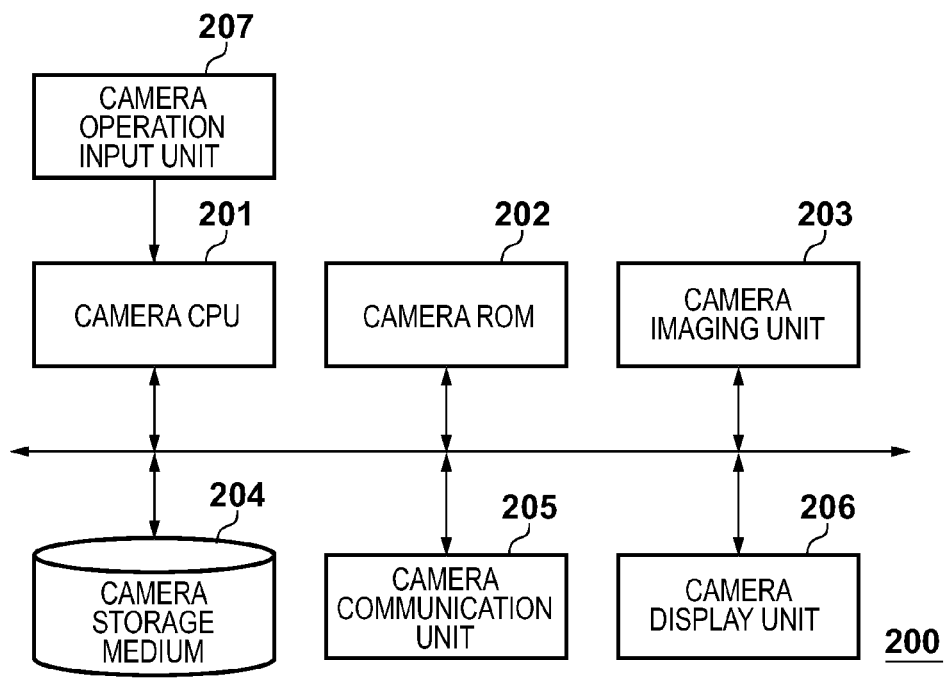
FIG. 2 is a block diagram showing the functional arrangement of an imaging apparatus 200 according to the embodiment of the present invention.

The arrangements of a PC 100 and imaging apparatus 200 according to this embodiment are the same as those described in the first embodiment with reference to FIGS. 1 and 2.

A face dictionary file and a face image file in this embodiment will be described first with reference to FIGS. 13A and 13B.

FIG. 13A shows an example of the arrangement of a face dictionary file according to this embodiment. A face dictionary file 1300 stores a face dictionary file name 1301, an update date and time 1302, a person name 1303, and detailed face image information 1304. The detailed face image information 1304 includes a face image file name 1341, a representative image flag 1342, a camera generation flag 1343, and face feature amount data 1344. Note that in this embodiment, the number (N) of face image files which can be stored in the detailed face image information 1304 has an upper limit, which is, for example, five. This is because, since the storage capacity of the camera storage medium 204 of the imaging apparatus 200 has the upper limit, the above limit is set to reduce the load concerning storage in the face dictionary file 1300 and a face image file 1320.

FIG. 13B shows an example of the arrangement of a face image file according to this embodiment. The face image file 1320 stores a face image file name 1321, an imaging date and time 1322, version information 1323, and face image data 1324.

<Generation Processing of Face Dictionary File>

Figure 14:
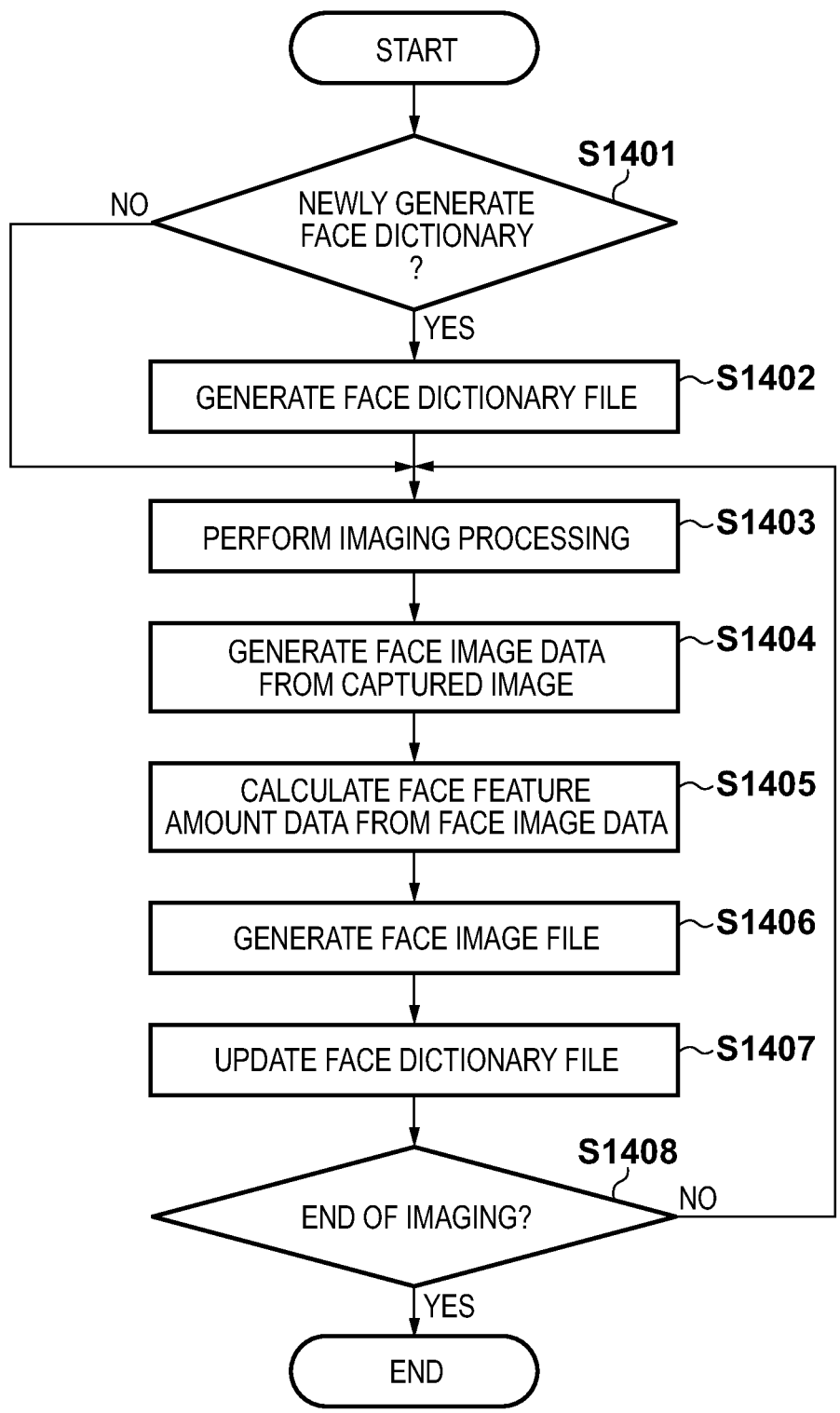
FIG. 14 is a flowchart exemplifying the operation of an imaging apparatus according to the second embodiment of the present invention.

The operation of generating a face dictionary file, which is performed by a camera CPU 201 of the imaging apparatus 200, will be described next with reference to the flowchart of FIG. 14. Assume that the camera CPU 201 of the imaging apparatus 200 has switched to a face dictionary imaging mode different from a general imaging mode and started operation in response to operation by the operator on a camera operation input unit 207.

In response to operation by the operator on the camera operation input unit 207, the camera CPU 201 detects whether it has accepted an instruction to newly generate a face dictionary file (step S1401). If the camera CPU 201 has accepted an instruction to newly generate a face dictionary file (YES in step S1401), the camera CPU 201 newly generates a face dictionary file and stores it in a camera storage medium 204 (step S1402). At this time, the camera CPU 201 issues the face dictionary file name 1301 indicating the name of the face dictionary file 1300, and stores it in the face dictionary file 1300. In addition, the camera CPU 201 obtains the date and time when it generated the face dictionary file, and stores it as the update date and time 1302 in the face dictionary file 1300.

The camera CPU 201 obtains an image by imaging an object by using the camera imaging unit 203 (step S1403). The camera CPU 201 extracts a face region by analyzing the captured image and generates the face image data 1324 (step S1404). The camera CPU 201 calculates the face feature amount data 1344 from the face image data 1324 (step S1405).

The camera CPU 201 then generates the face image file 1320 (step S1406). In this case, the camera CPU 201 issues the face image file name 1321 indicating the name of the face image file, and stores it in the face image file 1320. The camera CPU 201 obtains the imaging date and time of the image obtained in step S1403, and stores it as the imaging date and time 1322 in the face image file 1320. The camera CPU 201 stores, in the face image file 1320, the version information 1323 for specifying the face recognition algorithm used to generate the face image data from the image. The camera CPU 201 stores the face image data 1324 generated in step S1403 in the face image file 1320.

In response to operation by the operator on the camera operation input unit 207, the camera CPU 201 selects the face dictionary file 1300 and updates the selected face dictionary file 1300 (step S1407). Note that the timing of selecting operation for the face dictionary file 1300 is not limited to this. For example, the camera CPU 201 may perform this operation before imaging processing (step S1403). At this time, the camera CPU 201 stores information concerning the face image file in the detailed face image information 1304. The camera CPU 201 stores the face image file name 1341 indicating the name of the face image file generated in step S1406 in the face dictionary file 1300. The camera CPU 201 also stores, as a camera generation flag, a value indicating whether the face image file 1320 generated in step S1406 is a representative image of a plurality of face image files 1320 included in the face dictionary file 1300. The camera CPU 201 decides which one of the face image files 1320 is a representative image in response to operation by the operator on the camera operation input unit 207. Alternatively, the camera CPU 201 decides, for example, a face image file having the newest imaging date and time 1322 as a representative image based on the imaging date and time 1322 of the face image file 1320. In addition, the camera CPU 201 stores, in the camera generation flag 1343, a value indicating that the face image file 1320 was generated by the imaging apparatus 200. The camera CPU 201 stores the face feature amount data 1344 calculated in step S1405 in the face dictionary file 1300. The camera CPU 201 obtains the date and time when the face dictionary file 1300 was updated, and overwrites the update date and time 1302 with the obtained date and time.

The camera CPU 201 determines whether to terminate the imaging processing in the face dictionary imaging mode (step S1408). If the camera CPU 201 determines to continue the processing, the process advances to step S1403. If the camera CPU 201 determines to terminate the processing, the camera CPU 201 terminates the processing.

Figure 15:
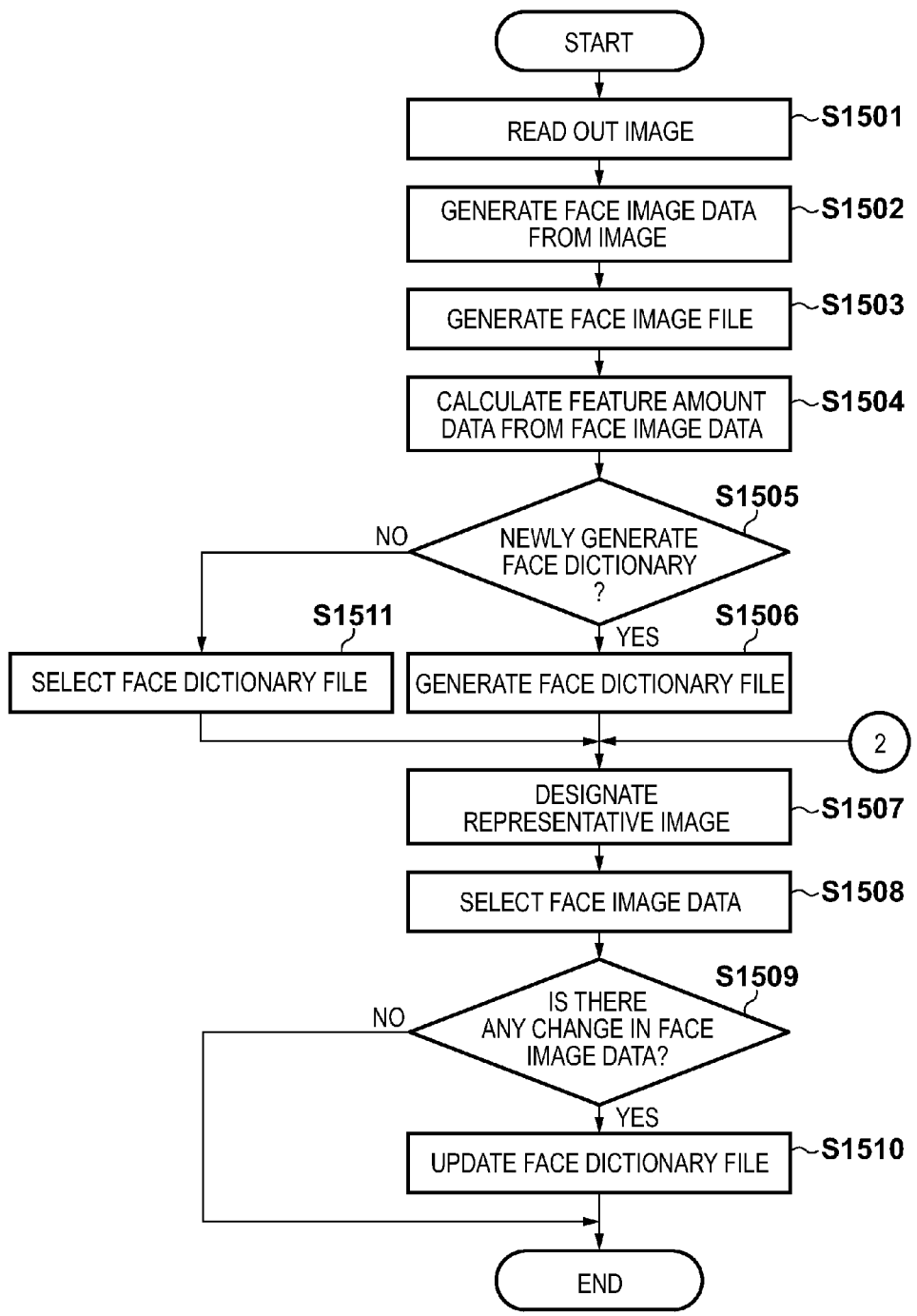
FIG. 15 is a flowchart exemplifying the operation of a PC according to the second embodiment of the present invention.

The operation of updating a face dictionary file, which is performed by a CPU 101 of the PC 100, will be described next with reference to the flowchart of FIG. 15. Assume that the CPU 101 of the PC 100 has accepted an instruction to update a face dictionary file and activated the face dictionary update application in response to operation by the user of the PC 100 on an operation input unit 107. In addition, the CPU 101 has received image files from a plurality of imaging apparatuses 200, downloaded image files from a Web server via the Internet, and stored a plurality of images in a storage medium 104 in association with a predetermined folder.

First of all, the CPU 101 reads out all the images stored in the storage medium 104 in association with the predetermined folder (step S1501), extracts a face region by analysis, and generates the face image data 1324 (step S1502). The CPU 101 then generates a face image file (step S1503).

The CPU 101 calculates the face feature amount data 1344 from the face image data 1324 (step S1504).

In response to operation by the user on the operation input unit 107, the CPU 101 of the PC 100 detects whether it has accepted an instruction to newly generate a face dictionary file (step S1505). Upon accepting an instruction to newly generate a face dictionary file (YES in step S1505), the CPU 101 newly generates a face dictionary file and stores it in the storage medium 104 (step S1506). The CPU 101 issues the face dictionary file name 1301 indicating the name of the face dictionary file 1300, and stores it in the face dictionary file 1300. The CPU 101 also obtains the date and time when the face dictionary file 1300 was generated, and stores the date and time as the update date and time 1302 in the face dictionary file 1300.

If the CPU 101 has not accepted an instruction to newly generate a face dictionary file (NO in step S1505), the CPU 101 determines to update a face dictionary file which has already been stored in the storage medium 104, and selects an update target from the existing face dictionary file (step S1510).

The CPU 101 designates one of a plurality of face image files stored in the storage medium 104 as a representative image (step S1507). In this case, the CPU 101 displays, on the display unit 106, out of the plurality of face image files stored in the storage medium 104, a list screen of face image files whose imaging dates and times fall within a predetermined period, and designates a face image file as a representative image in response to operation by the user on the operation input unit 107. This embodiment will be described on the assumption that the predetermined period is, for example, before less than one year from the current time.

The CPU 101 selects a face image file stored in the face dictionary file 1300 (step S1508). For example, the CPU 101 selects a predetermined number of face image files from the face image files stored in the storage medium 104 in ascending order of feature amount data differences based on the feature amount data of the face image file of the representative image. Alternatively, the CPU 101 selects a predetermined number of face image files, in reverse chronological order of imaging dates and times, from face image files, out of the face image files stored in the storage medium 104, which exhibit feature amount data differences smaller than a predetermined value. Alternatively, the CPU 101 calculates the total sum of the differences between the feature amount data of face image files included in combinations of a predetermined number of face image files, including the face image file of a representative image, selected from the face image files stored in the storage medium 104. The CPU 101 then selects a combination of face image files corresponding to a calculation result smaller than a predetermined upper limit and larger than a predetermined lower limit. In this case, selecting combinations corresponding to feature amount data differences smaller than the predetermined upper limit can prevent face image files of other persons different from a desired person from being included in selected combinations. In addition, selecting combinations corresponding to feature amount data differences larger than the predetermined lower limit can improve the search accuracy by using different types (facial expression, hairstyle, face direction, and the like) of face image files of the same person.

The CPU 101 then determines whether there is a change between an existing face image file in the face dictionary and the face image file selected in step S1508 (step S1509). If there is a change (YES in step S1509), the CPU 101 updates the face dictionary file 1300 by using the detailed face image information 1304 concerning the face image file selected in step S1508 (step S1510). The CPU 101 stores the face image file name 1341 of the face image file selected in step S1508 in the face image file 1320. If the image file is designated as a representative image in step S1507, the CPU 101 stores a value indicating a representative image in the representative image flag 1342. If the image file is not designated as a representative image in step S1507, the CPU 101 stores a value indicating that the image file is not a representative image in the representative image flag 1342. The CPU 101 stores a value indicating that the face image file has not been generated by the imaging apparatus 200 in the camera generation flag 1343. The CPU 101 reads out the face feature amount data 1344 of the image file calculated in step S1504 from the storage medium 104, and stores the data in the face dictionary file 1300.

In contrast, if there is no change between the existing face image file in the face dictionary file and the face image file selected in step S1508 (NO in step S1509), the CPU 101 terminates this processing without updating the face dictionary file.

<Synchronization Processing for Face Dictionary File>

Figure 16:
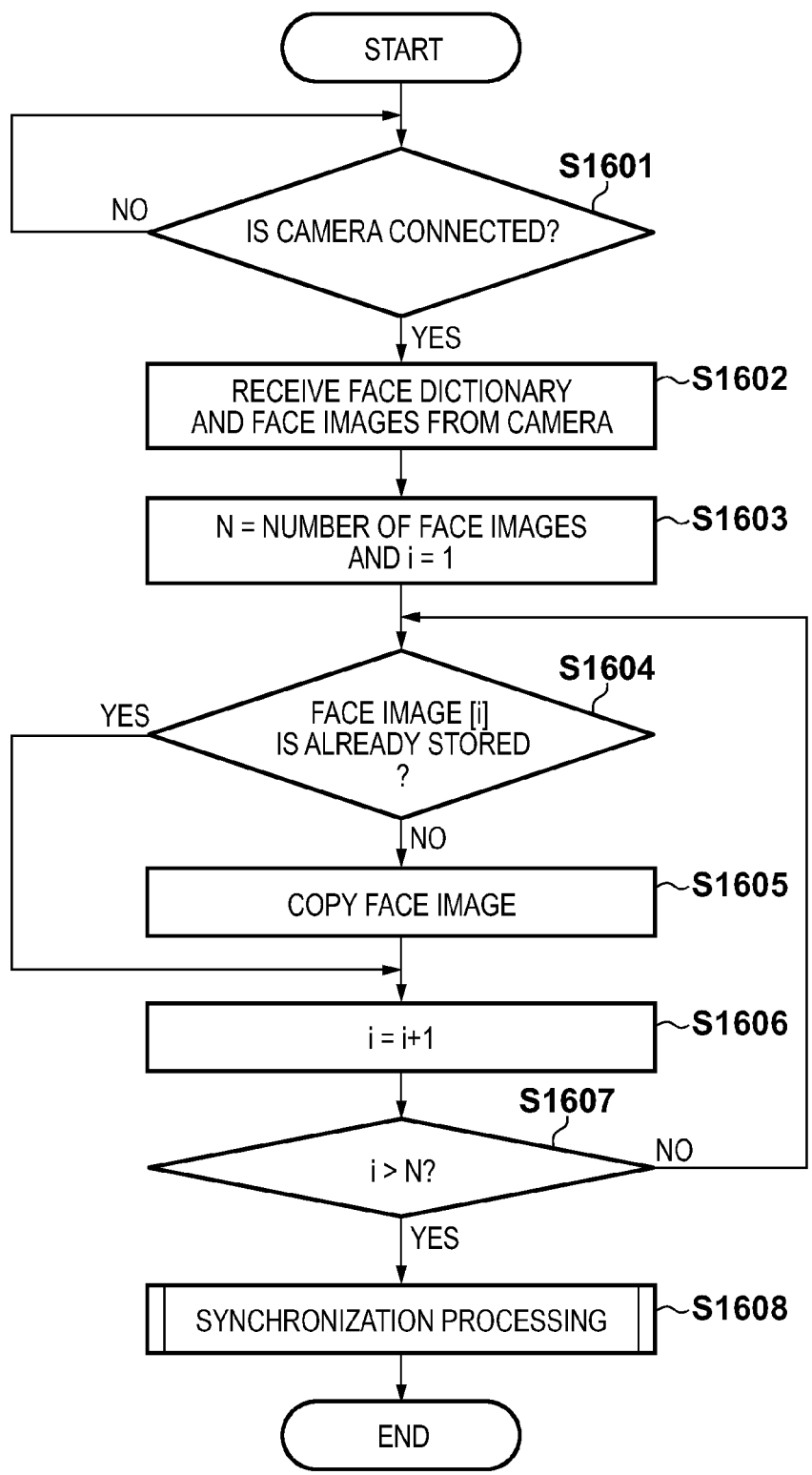
FIG. 16 is a flowchart exemplifying the operation of a PC according to the second embodiment of the present invention.

The operation of the PC 100 when the imaging apparatus 200 is connected to the PC 100 will be described with reference to the flowchart of FIG. 16.

First of all, the CPU 101 of the PC 100 operates in accordance with a predetermined control program and the OS, and detects whether the imaging apparatus 200 is connected (step S1601). Upon detecting that the imaging apparatus 200 is connected (YES in step S1601), the CPU 101 activates the face dictionary update application. The CPU 101 then receives the face dictionary file 1300 and the face image file 1320 from the imaging apparatus 200, and temporarily stores them in the RAM 103 (step S1602). The CPU 101 assigns the total number of received face image files 1320 to a variable N, and assigns "1" to a variable i (step S1603).

The CPU 101 then determines whether the received ith face image file 1320 has already been stored in the storage medium 104 (step S1604). In step S1604, the CPU 101 compares the imaging date and time 1322 of the received ith face image file 1320 with the imaging date and time 1322 of the face image file 1320 stored in the storage medium 104. If the storage medium 104 includes a face image file having an imaging date and time coinciding with the imaging date and time 1322 of the received ith face image file 1320, the CPU 101 determines that the received ith face image file 1320 has been stored in the storage medium 104. If the storage medium 104 does not include any face image file having an imaging date and time coinciding with the imaging date and time 1322 of the received ith face image file 1320, the CPU 101 determines that the received ith face image file 1320 has not yet been stored in the storage medium 104. Upon determining that the received ith face image file 1320 has already been stored in the storage medium 104 (YES in step S1604), the CPU 101 executes the processing in step S1606.

Upon determining that the received ith face image file 1320 has not yet been stored in the storage medium 104 (NO in step S1604), the CPU 101 copies the received ith face image file 1320, and stores it in the storage medium 104 (step S1605). This makes the ith face image file 1320 received from the imaging apparatus 200 become a selection target in step S1508 in FIG. 15, thereby allowing the file to be used for the face dictionary file 1300 generated by the PC 100.

The CPU 101 adds 1 to the variable i (step S1606). If the variable i is smaller than the variable N (NO in step S1607), the CPU 101 executes the processing in step S1604 for the remaining face image files 1320. If the variable i is larger than the variable N (YES in step S1607), the CPU 101 executes the synchronization processing in step S1608.

As described above, when the imaging apparatus 200 is connected to the PC 100, the PC 100 always stores face image files in the storage medium 104 before executing the synchronization processing. This makes it possible to hold the face image files generated by the imaging apparatus 200 and prevent them from disappearing even when the synchronization processing is executed.

The synchronization processing for a face dictionary file in the PC 100 will be described next with reference to FIGS. 17A and 17B.

First of all, the CPU 101 of the PC 100 determines whether it has received an instruction to execute the synchronization processing between a face dictionary file on the PC side and a face dictionary file on the camera side (step S1701). Upon receiving an instruction to execute the synchronization processing (YES in step S1701), the CPU 101 compares the person name 1303 in the face dictionary file 1300 on the PC side with the person name 1303 in the face dictionary file 1300 (step S1702). The CPU 101 obtains identical person names as the result of the comparison (step S1703), and assigns the number of identical person names to the variable N, and assigns "1" to the variable i (step S1704). The CPU 101 then compares the update dates and times 1302 of the face dictionary files 1300 having the ith identical person names 1303 in the imaging apparatus 200 and the PC 100 with each other (step S1705).

If the update date and time of the face dictionary file in the PC 100 is later than those in the imaging apparatus 200 (YES in step S1705), the CPU 101 determines whether the imaging dates and times of all the face image files belonging to the face dictionary file in the PC 100 is before less than one year (step S1706). If the imaging dates and times of all the face image files belonging to the face dictionary file in the PC 100 is before less than one year (YES in step S1706), the face dictionary file and the face image files belonging to it in the PC 100 are transmitted to the imaging apparatus 200 (step S1707). In contrast, if the imaging dates and times of all the face image files belonging to the face dictionary file in the PC 100 are not before less than one year (NO in step S1706), the process advances to step S1709 without transmitting the face dictionary in the PC 100 to the imaging apparatus 200. In other words, if the imaging date and time of at least one of the face imaging files belonging to the face dictionary file in the PC 100 is before more than one year, the CPU 101 does not transmit the face dictionary in the PC 100 to the imaging apparatus 200.

In this case, this embodiment selectively executes transmission processing of a face dictionary file depending on whether the imaging dates and times of all the face image files belonging to the face dictionary are before less than one year in step S1706. The imaging apparatus 200 uses the face dictionary file for face recognition processing for image files captured afterward. Since the face of a person changes with time, using old face image files for recognition processing for the face of the person during imaging will decrease the accuracy. It is therefore necessary to obtain new face image files. On the other hand, since the PC 100 accumulates image files captured in the past and uses a face dictionary file for face recognition processing for image files captured in the past, it is sometimes necessary to use old face image files.

This embodiment has exemplified the processing in step S1706 when the imaging dates and times of all the face image files belonging to the face dictionary file are before less than one year. However, in order to increase the accuracy in face recognition processing, it is necessary to consider not only imaging dates and times but also facial expressions, face directions, and the like. In step S1706, the PC 100 determines whether the imaging date and time of at least one face image file is before less than one year. If the imaging date and time of at least one face image file is before less than one year (YES in step S1706), the PC 100 executes the processing in step S1707. Furthermore, the CPU 101 may determine variations of the facial expressions or face directions of face image files included in a face dictionary file. If the variations are large, the CPU 101 may execute the processing in step S1707.

If the update date and time of the face dictionary file in the PC 100 is before those in the imaging apparatus 200 (NO in step S1705), the CPU 101 overwrites the face dictionary file of the ith identical person name in the storage medium 104 with the face dictionary file in the imaging apparatus 200 (step S1708). This replaces the face dictionary file in the PC 100 with a new one to synchronize with the face dictionary file in the imaging apparatus 200. Note however that the face image file 1320 belonging to the face dictionary file 1300 in the PC 100 is held before the above operation without being overwritten and being deleted from the storage medium 104. This is because, the storage capacity of the storage medium 104 in the PC 100 is larger than that of the camera storage medium 204 in the imaging apparatus 200 and is large enough to hold the file. This makes it possible to also make the held face image file 1320 become a selection target in step S1508 in FIG. 15 and allow it be used again when the CPU 101 updates the face dictionary file 1300 by executing the above face dictionary file generation processing in response to operation by the user.

The CPU 101 further optimizes the new face dictionary file of the ith identical person name obtained from the imaging apparatus 200 by using the face image files stored in the storage medium 104. More specifically, the CPU 101 executes the same processing as that in steps S1507 to S1510 in FIG. 15 described above. In this case, in step S1507, the CPU 101 designates a representative image based on the representative image flag of the new face dictionary file. Subsequently, if the face dictionary file has been updated (YES in step S1718), the CPU 101 executes the processing in step S1707. If the face dictionary file has not been updated (NO in step S1718), the CPU 101 executes the processing in step S1709.

The CPU 101 adds 1 to the variable i (step S1709). If the variable i is smaller than the variable N (NO in step S1710), the CPU 101 executes the processing in step S1705. If the variable i is larger than the variable N (YES in step S1710), the CPU 101 executes the processing in step S1711.

The CPU 101 determines whether the face dictionary files 1300 in the imaging apparatus 200, which are received in step S1402, include the face dictionary file 1300 of a person name which does not exist in the PC 100 (step S1711). If such file exists (YES in step S1711), the CPU 101 additionally stores the face dictionary file 1300 of the corresponding person name in the storage medium 104 (step S1712). If no such file exists (NO in step S1711), the process advances to step S1713.

The CPU 101 determines whether the imaging dates and times of all the face image files belonging to the face dictionary file in the PC 100 are before less than one year and any face dictionary file whose person name does not exist in the face dictionary file in the imaging apparatus 200 exists (step S1713). If such face dictionary files exist (YES in step S1713), the CPU 101 obtains the number of corresponding person names (step S1714). The CPU 101 determines whether the sum of the number of person names obtained in step S1709 and the number of received face dictionary files 1300 in the imaging apparatus 200 exceeds a predetermined number (step S1715). If the sum does not exceed the predetermined number (NO in step S1715), the CPU 101 transmits the face dictionary files 1300 whose person names do not exist in the imaging apparatus 200 to the imaging apparatus 200 (step S1717).

If the sum exceeds the predetermined number (YES in step S1715), the CPU 101 selects the face dictionary files 1300 of the corresponding person names by the number corresponding to the difference between the number of received face dictionary files 1300 in the imaging apparatus 200 and the predetermined number (step S1716). In step S1715, the CPU 101 sequentially selects the face image files 1320 from all the face image files 1320 belonging to the face dictionary files 1300, whose imaging dates and times 1322 are before less than one year, in descending order of the numbers of face image files 1320 belonging to the face dictionary files 1300. The CPU 101 then transmits the selected face dictionary files 1300 to the imaging apparatus 200 (step S1717).

If the CPU 101 determines in step S1706 or S1713 that all the face image files belonging to the face dictionary file are not those which were captured within one year, the CPU 101 may display an error message. The CPU 101 further notifies the user to change the face image files included in the face dictionary file 1300 in the PC 100 to those captured within one year. In response to operation by the user, the CPU 101 may change the face image files belonging to the face dictionary file, and then execute the processing in step S1706 or S1703 again.

In this embodiment, in step S1705, the CPU 101 compares the update dates and times of face image files in the PC 100 and the imaging apparatus 200 with each other, decides, based on the result, which face dictionary file is to be used for updating, and selectively executes transmission processing for each face image file in the PC 100. However, the present invention is not limited to this. For example, the CPU 101 may compare the numbers of face image files belonging to face dictionary files with each other, and updates one face dictionary file with the other face dictionary file including a larger number of face image files. In this manner, it is possible to decide to select either a face dictionary file in the PC 100 or a face dictionary file in the imaging apparatus 200 under other predetermined conditions.

Synchronization processing for a face dictionary file in the imaging apparatus 200 will be described next with reference to FIG. 18.

First of all, the camera CPU 201 of the imaging apparatus 200 transmits the face dictionary file 1300 stored in the camera storage medium 204 and face image files belonging to the face dictionary file to the PC 100 when being connected to the PC 100 and receiving a request (step S1801).

Figure 17A:
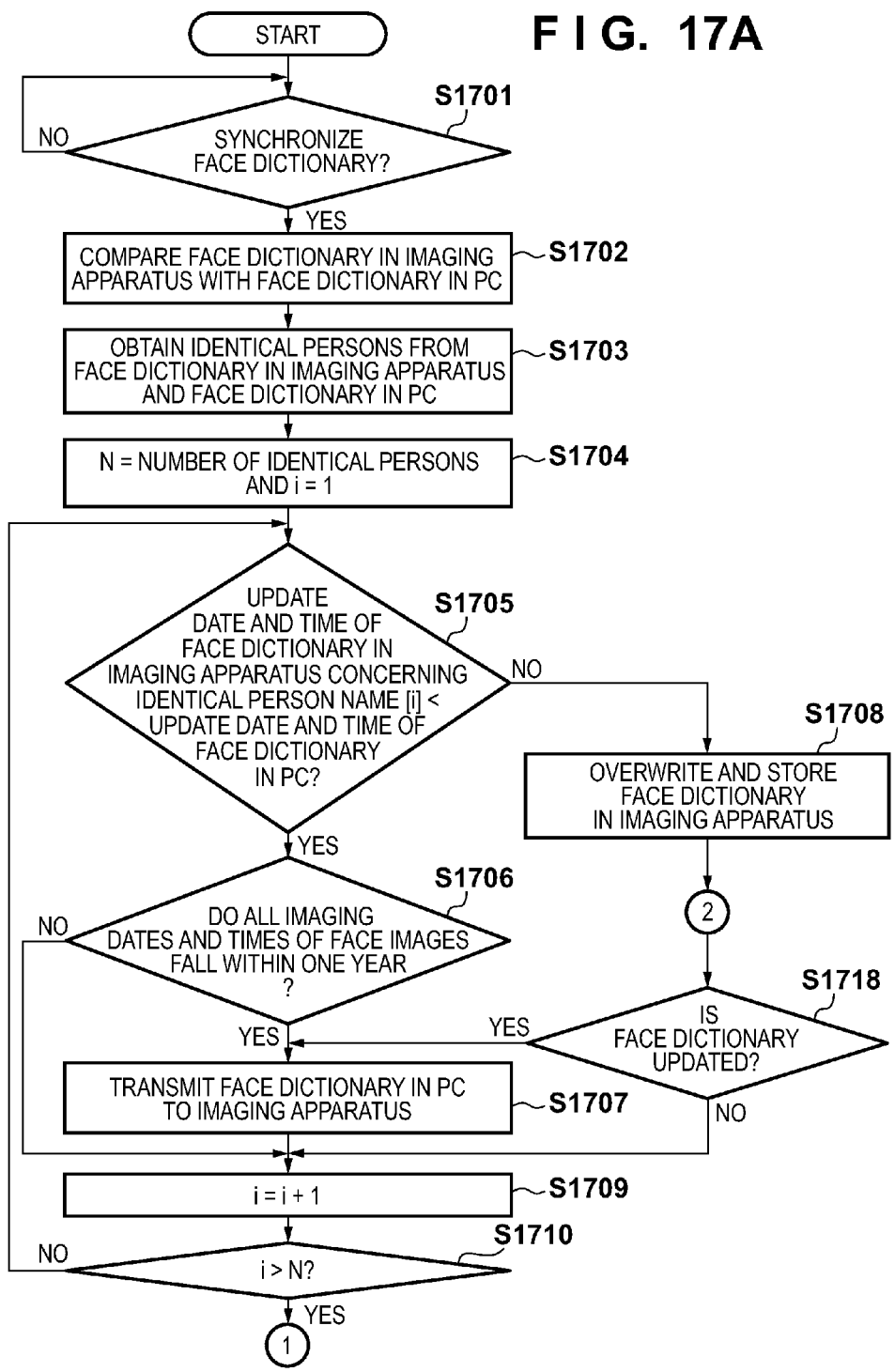
FIGS. 17A and 17B are flowcharts exemplifying the operation of the PC according to the second embodiment of the present invention.
Figure 17B:
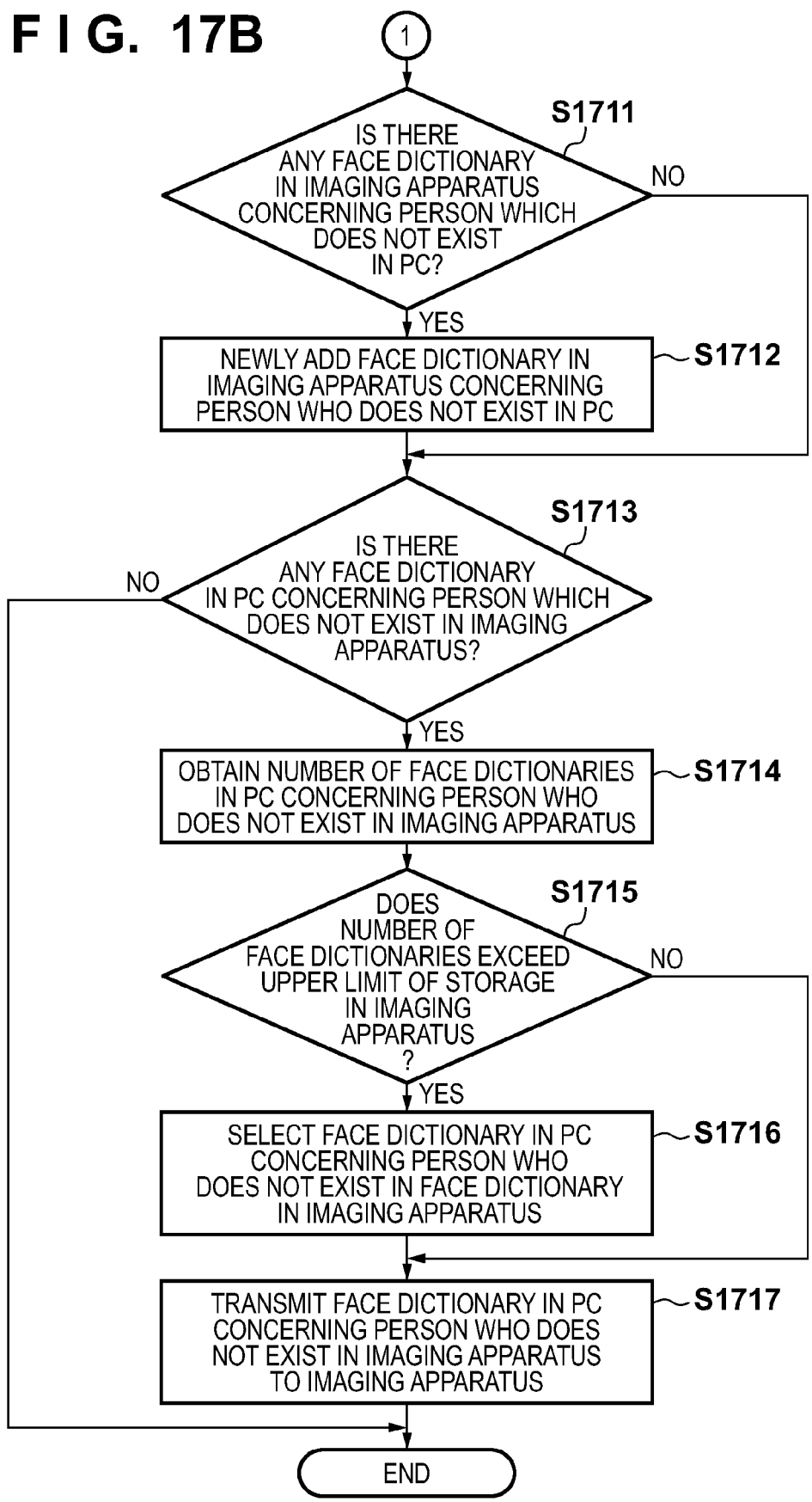

The camera CPU 201 detects whether it has received the face dictionary file and face image files transmitted from the PC 100 in step S1707 in FIG. 17A or 51717 in FIG. 17B (step S1802). Upon receiving the files (YES in step S1802), the camera CPU 201 assigns the total number of face dictionary files 1300 received from the PC 100 to the variable N, and assigns "1" to the variable i (step S1803). The camera CPU 201 determines whether the face dictionary file 1300 of the same person name as that of the received ith face dictionary file 1300 is stored in the camera storage medium 204 (step S1804). Upon determining that such file is stored (YES in step S1804), the camera CPU 201 overwrites a face dictionary file of the same person name as that of the ith face dictionary file in the camera storage medium 204 and the corresponding face image files with the ith face dictionary file and its face image files (step S1805). This will erase the existing face image files of the same person name as that of the ith face dictionary file 1300 from the camera storage medium 204. With the overwrite processing in step S1805, it is possible to store the new face dictionary file 1300 and the face image files belonging to it in the camera storage medium 204 even if the storage capacity of the camera storage medium 204 is much smaller than that of the storage medium 104. This makes it possible to use the new face dictionary file 1300 generated in the PC 100 at the time of, for example, imaging processing by the imaging apparatus 200.

In contrast to this, upon determining that no such file is stored (NO in step S1804), the camera CPU 201 executes the storage processing in step S1807.

The camera CPU 201 then adds 1 to the variable i (step S1807). If the variable i is smaller than the variable N (NO in step S1807), the camera CPU 201 executes the processing in step S1804. If the variable i is larger than the variable N (YES in step S1807), the camera CPU 201 terminates this processing.

Note that if the camera CPU 201 has received no face dictionary file and no face image files from the PC 100 (NO in step S1802), the camera CPU 201 terminates this processing without executing it. In this case, the face dictionary file in the PC 100 has been overwritten with the face dictionary file in the imaging apparatus 200. This makes the imaging apparatus 200 and the PC 100 hold identical face dictionary files, that is, synchronizes face dictionary files.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282265, filed Dec. 22, 2011, and the benefit of Japanese Patent Application No. 2012-264744, filed Dec. 3, 2012, which are hereby incorporated by reference herein in their entirety.

What is claimed is:

1. An information processing apparatus comprising:
  a central processing unit (CPU) configured to implement the functions of a generation unit, a reception unit and a transmission unit;
  the generation unit configured to generate, for each person, a first face dictionary storing face data concerning a face of the person included in an image;
  the reception unit configured to receive a second face dictionary storing face data of a person corresponding to the first face dictionary from an imaging apparatus, the second face dictionary being updated by the imaging apparatus based on face data of the person included in an image obtained by the imaging apparatus;
  a storage unit configured to store the face data stored in the received second face dictionary in a predetermined storage device; and
  the transmission unit configured to transmit the first face dictionary to the imaging apparatus when an update date and time of the second face dictionary is older than a date and time of the first face dictionary, the second face dictionary being overwritten with the transmitted first face dictionary in the imaging apparatus, wherein said transmission unit does not transmit the first face dictionary to the imaging apparatus if the first face dictionary includes face data of the person included in an image captured outside of a predetermined period.

2. The apparatus according to claim 1, wherein said storage unit stores, in the storage device, face data, out of the face data stored in the received second face dictionary, which has not yet been stored in the storage device.

3. The apparatus according to claim 1, further comprising a selection unit configured to select a predetermined number of face data from face data of the person included in a plurality of images stored in a predetermined storage area and the face data included in the second face dictionary,
   wherein the selection unit is implemented by the CPU and said generation unit generates the first face dictionary storing the selected face data.

4. The apparatus according to claim 3, further comprising a display configured to display, on a screen, a result of execution of search processing for images stored in a predetermined storage area based on the first face dictionary storing the selected face data.

5. The apparatus according to claim 1, wherein said reception unit also receives, from the imaging apparatus, a second face dictionary storing face data of another person, and
   said storage unit stores, in a predetermined storage area, a second face dictionary, out of the received second face dictionaries, which corresponds to a person and is not generated by said generation unit.

6. The apparatus according to claim 1, wherein said reception unit receives second face dictionaries corresponding to all persons which are held by the imaging apparatus, and
   said transmission unit transmits a first face dictionary, out of first face dictionaries generated by said generation unit, which corresponds to a person and is not held by the imaging apparatus.

7. The apparatus according to claim 6, wherein said transmission unit transmits the first face dictionaries to the imaging apparatus such that a total number of first face dictionaries and second face dictionaries held by the imaging apparatus does not exceed a predetermined number.

8. The apparatus according to claim 1, wherein face data includes at least one of a face image, of the image, which corresponds to a face region of the person and a feature amount of the face image.

9. The apparatus according to claim 1, wherein the predetermined period is before less than predetermined time from current time.

10. An information processing method comprising:
    a generation step of generating, for each person, a first face dictionary storing face data concerning a face of the person included in an image;
    a reception step of receiving a second face dictionary storing face data of a person corresponding to the first face dictionary from an imaging apparatus, the second face dictionary being updated by the imaging apparatus based on face data of the person included in an image obtained by the imaging apparatus;
    a storage step of storing the face data stored in the received second face dictionary in a predetermined storage device; and
    a transmission step of transmitting the first face dictionary to the imaging apparatus when an update date and time of the second face dictionary is older than a date and time of the first face dictionary, the second face dictionary being overwritten with the transmitted first face dictionary in the imaging apparatus,
    wherein in the transmission step, the first face dictionary is not transmitted to the imaging apparatus if the first face dictionary includes face data of the person included in an image captured outside of a predetermined period.

11. The method according to claim 10, wherein in the storage step, face data, out of the face data stored in the received second face dictionary, which has not yet been stored in the storage device is stored in the storage device.

12. The method according to claim 10, further comprising a selection step of selecting a predetermined number of face data from face data of the person included in a plurality of images stored in a predetermined storage area and the face data included in the second face dictionary,
    wherein in the generation step, the first face dictionary storing the selected face data is generated.

13. The method according to claim 12, further comprising a display step of displaying, on a screen, a result of execution of search processing for images stored in a predetermined storage area based on the first face dictionary storing the selected face data.

14. The method according to claim 10, wherein in the reception step, a second face dictionary storing face data of another person is also received from the imaging apparatus, and
    in the storage step, a second face dictionary, out of the received second face dictionaries, which corresponds to a person and is not generated in the generation step is stored in a predetermined storage area.

15. The method according to claim 10, wherein in reception step, second face dictionaries corresponding to all persons which are held by the imaging apparatus are received, and
    in the transmission step, a first face dictionary, out of first face dictionaries generated in the generation step, which corresponds to a person and is not held by the imaging apparatus is transmitted to the imaging apparatus.

16. The method according to claim 15, wherein in the transmission step, the first face dictionaries to the imaging apparatus is transmitted to the imaging apparatus such that a total number of first face dictionaries and second face dictionaries held by the imaging apparatus does not exceed a predetermined number.

17. The method according to claim 10, wherein face data includes at least one of a face image, of the image, which corresponds to a face region of the person and a feature amount of the face image.

18. The method according to claim 10, wherein the predetermined period is before less than predetermined time from current time.

19. A non-transitory computer-readable storage medium storing a program that, when executed by a processor, causes the processor to perform operations comprising:
    generating, for each person, a first face dictionary storing face data concerning a face of the person included in an image;
    receiving a second face dictionary storing face data of a person corresponding to the first face dictionary from an imaging apparatus, the second face dictionary being updated by the imaging apparatus based on face data of the person included in an image obtained by the imaging apparatus;
    storing the face data stored in the received second face dictionary in a predetermined storage device; and
    transmitting the first face dictionary to the imaging apparatus when an update date and time of the second face dictionary is older than a date and time of the first face dictionary, the second face dictionary being overwritten with the transmitted first face dictionary in the imaging apparatus and not transmitting the first face dictionary to the imaging apparatus if the first face dictionary includes face data of the person included in an image captured outside of a predetermined period.

20. The non-transitory computer-readable storage medium according to claim 19, wherein, in the operation for storing, face data out of the face data stored in the received second face dictionary, which has not yet been stored in the storage device, is stored in the storage device.

21. The non-transitory computer-readable storage medium according to claim 19, wherein, the operations further comprising an operation for selecting a predetermined number of face data from face data of the person included in a plurality of images stored in a predetermined storage area and the face data included in the second face dictionary, wherein, in the operation for generating, the first face dictionary storing the selected face data is generated.

22. The non-transitory computer-readable storage medium according to claim 21, wherein, the operations further comprising an operation for displaying, on a screen, a result of execution of search processing for images stored in a predetermined storage area based on the first face dictionary storing the selected face data.

23. The non-transitory computer-readable storage medium according to claim 19, wherein, in the operation for receiving, a second face dictionary storing face data of another person is also received from the imaging apparatus, and
in the operation for storing, a second face dictionary out of the received second face dictionaries, which corresponds to a person and is not generated in the operation for generating, is stored in a predetermined storage.

24. The non-transitory computer-readable storage medium according to claim 19, wherein, in the operation for receiving, second face dictionaries corresponding to all persons which are held by the imaging apparatus are received, and
in the operation for transmitting, a first face dictionary out of first face dictionaries generated in the operation for generating, which corresponds to a person and is not held by the imaging apparatus, is transmitted.

25. The non-transitory computer-readable storage medium according to claim 24, wherein, in the operation for transmitting, the first face dictionaries are transmitted to the imaging apparatus such that a total number of first face dictionaries and second face dictionaries held by the imaging apparatus does not exceed a predetermined number.

26. The non-transitory computer-readable storage medium according to claim 19, wherein face data includes at least one of a face image, of the image, which corresponds to a face region of the person and a feature amount of the face image.

27. The non-transitory computer-readable storage medium according to claim 19, wherein the predetermined period is before less than predetermined time from current time.

28. An information processing apparatus comprising:
a central processing unit configured to implement the functions of a generation unit, a determining unit, and a transmission unit;
the generation unit configured to generate, for each person, a piece of face dictionary information storing face data concerning a face of the person included in an image;
the determining unit determines if the piece of face dictionary information to be transmitted includes at least one piece of face data of an image which was captured outside of a specified period; and
the transmission unit configured to transmit the piece of face dictionary information to an imaging apparatus if the piece of face dictionary information does not include a piece of face data of an image which was captured outside of the specified period, wherein the piece of face dictionary information is used by the imaging apparatus when the imaging apparatus performs capturing process,
wherein said transmission unit does not transmit the piece of face dictionary information to the imaging apparatus if the piece of face dictionary information includes at least one piece of face data of an image which was captured outside of the specified period.

29. An information processing method comprising:
a generation step of generating, for each person, a piece of face dictionary information storing face data concerning a face of the person included in an image;
a determining unit determines if the piece of face dictionary information to be transmitted includes at least one piece of face data of an image which was captured outside of a specified period; and
a transmission step of transmitting the piece of face dictionary information to an imaging apparatus if the piece of face dictionary information does not include a piece of face data of an image which was captured outside of the specified period, wherein the piece of face dictionary information is used by the imaging apparatus when the imaging apparatus performs capturing process,
wherein, in the transmission step, the piece of face dictionary information is not transmitted to the imaging apparatus if the piece of face dictionary information includes at least one piece of face data an image which was captured outside of the specified period.

30. A non-transitory computer-readable storage medium storing a program that, when executed by a processor, causes the processor to perform operations comprising:
generating, for each person, a piece of face dictionary information storing face data concerning a face of the person included in an image;
determining if the piece of face dictionary information to be transmitted includes at least one piece of face data of an image which was captured outside of a specified period; and
transmitting the piece of face dictionary information to an imaging apparatus if the piece of face dictionary information does not include a piece of face data of an image which was captured outside of the specified period, wherein the piece of face dictionary information is used by the imaging apparatus when the imaging apparatus performs capturing process,
wherein, in the operation for transmitting, if the piece of face dictionary information includes at least one piece of face data of an image which was captured outside of the specified period, the piece of face dictionary information is not transmitted to the imaging apparatus.

* * * * *